United States Patent
Cook et al.

(10) Patent No.: US 6,822,662 B1
(45) Date of Patent: Nov. 23, 2004

(54) USER SELECTED DISPLAY OF TWO-DIMENSIONAL WINDOW IN THREE DIMENSIONS ON A COMPUTER SCREEN

(75) Inventors: Thomas E. Cook, Essex Junction, VT (US); Michael D. Essenmacher, Ulster Park, NY (US); Clark A. Goodrich, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 09/282,129

(22) Filed: Mar. 31, 1999

(51) Int. Cl.⁷ ............................................. G09G 5/00
(52) U.S. Cl. .................... 345/788; 345/659; 345/649; 345/656; 345/764
(58) Field of Search ........................ 345/355, 340, 345/343, 427, 978, 788, 419, 764, 145, 672, 682, 649, 656, 659

(56) References Cited

U.S. PATENT DOCUMENTS

| | | | |
|---|---|---|---|
| 4,555,775 A | 11/1985 | Pike | 364/900 |
| 4,819,189 A | 4/1989 | Kikuchi et al. | 364/521 |
| 4,835,528 A | 5/1989 | Flinchbaugh | 340/709 |
| 4,987,527 A | 1/1991 | Hamada et al. | 364/167.01 |
| 5,121,477 A | 6/1992 | Koopmans et al. | 395/156 |
| 5,146,556 A | 9/1992 | Hullot et al. | 395/159 |
| 5,179,656 A | 1/1993 | Lisle | 395/159 |
| 5,179,700 A | 1/1993 | Aihara et al. | 395/650 |
| 5,555,366 A * | 9/1996 | Teig et al. | 395/161 |
| 5,880,733 A * | 3/1999 | Horvitz et al. | 345/355 |
| 6,023,275 A * | 2/2000 | Horvitz et al. | 345/342 |
| 6,226,006 B1 * | 5/2001 | Collodi | 345/426 |
| 6,229,542 B1 * | 5/2001 | Miller | 345/358 |

FOREIGN PATENT DOCUMENTS

| | | | |
|---|---|---|---|
| EP | 0547993 A2 | 6/1993 | G06F/3/033 |
| JP | 5-46707 | 2/1993 | G06F/15/60 |
| JP | 5-91997 | 4/1993 | |
| JP | 06-186948 | 7/1994 | G09G/5/14 |
| JP | 06-222899 | 8/1994 | G06F/3/14 |
| JP | 08-083161 | 3/1996 | G06F/3/14 |
| JP | 09-022340 | 1/1997 | G06F/3/14 |
| JP | 10-283158 | 10/1998 | G06F/3/14 |
| JP | 11-065806 | 3/1999 | G06F/3/14 |

OTHER PUBLICATIONS

E.L. Haletky and L. Vepstas, "Opening a 3D GL Window as a Child of a 2D X Window", Reproduced from Research Disclosure, Jun. 1991, No. 326, copyright Kenneth Mason Publications Ltd., England, AT890–0592 PSD, 1 p.

Crichton, Michael, "The Lost World" *Alfred A. Knopf, Inc.* (1995).

German Press Release in Computerwoche Online (Nov. 15, 2000).

(List continued on next page.)

*Primary Examiner*—Ba Huynh
*Assistant Examiner*—Mylinh Tran
(74) *Attorney, Agent, or Firm*—William A. Kinnaman, Esq.; Kevin P. Radigan, Esq.; Heslin Rothenberg Farley & Mesiti P.C.

(57) ABSTRACT

A computer display system, method and article of manufacture are presented allowing a user to interactively arrange two-dimensional windows for display in three dimensions on a two-dimensional display screen of the computer system. A window manager associated with the display screen is configured to respond to a user's selection of a frame edge of a window, e.g., using a third mouse button, by rotating the window from a two-dimensional depiction to a three-dimensional depiction. Rotation of the window occurs on an edge frame opposite to the selected edge frame and the rotation angle is related to the magnitude that the user drags the pointing device after selection of one edge frame of the window to be swung. In a similar manner, multiple windows can be swung for three-dimensional viewing and simultaneous display within the display screen.

43 Claims, 21 Drawing Sheets

OTHER PUBLICATIONS

Russian Press Release in c.news (Nov. 16, 2000), http://www.cnews.ru/topnews/2000/11/16/content1.shtml (English translation provided by http://babel.altavista.com/tr).

Italian Press Release in HTMLIT.com "Introduced to the Comdex first browser 3 D" (Nov. 16, 2000), http://www.2ce.com/press_htmlit1116.html (English translation provided by http://babel.altavista.com/tr).

Press Release in Venturewire New Money: Software Developer 2Ce Raises $2.75 Million in Series A (Sep. 6, 2000), http://www.2ce.com/press_venture96.html.

Press Release in Venturewire "Web Tool Firm 2Ce Appoints Software Firm Founder to Board" (Nov. 14, 2000), http://www.2ce.com/press_venture1114.html.

Press Release in Wired News "Cubism, Web-Brower Style" (Nov. 14, 2000), http://www.2ce.com/press_wired1114.html.

Press Release in Newsbytes "Software Company Demos 3-D Browser at Comdex" (Nov. 14, 2000), http://www.2ce.com/press_newsbytes1114.html.

* cited by examiner

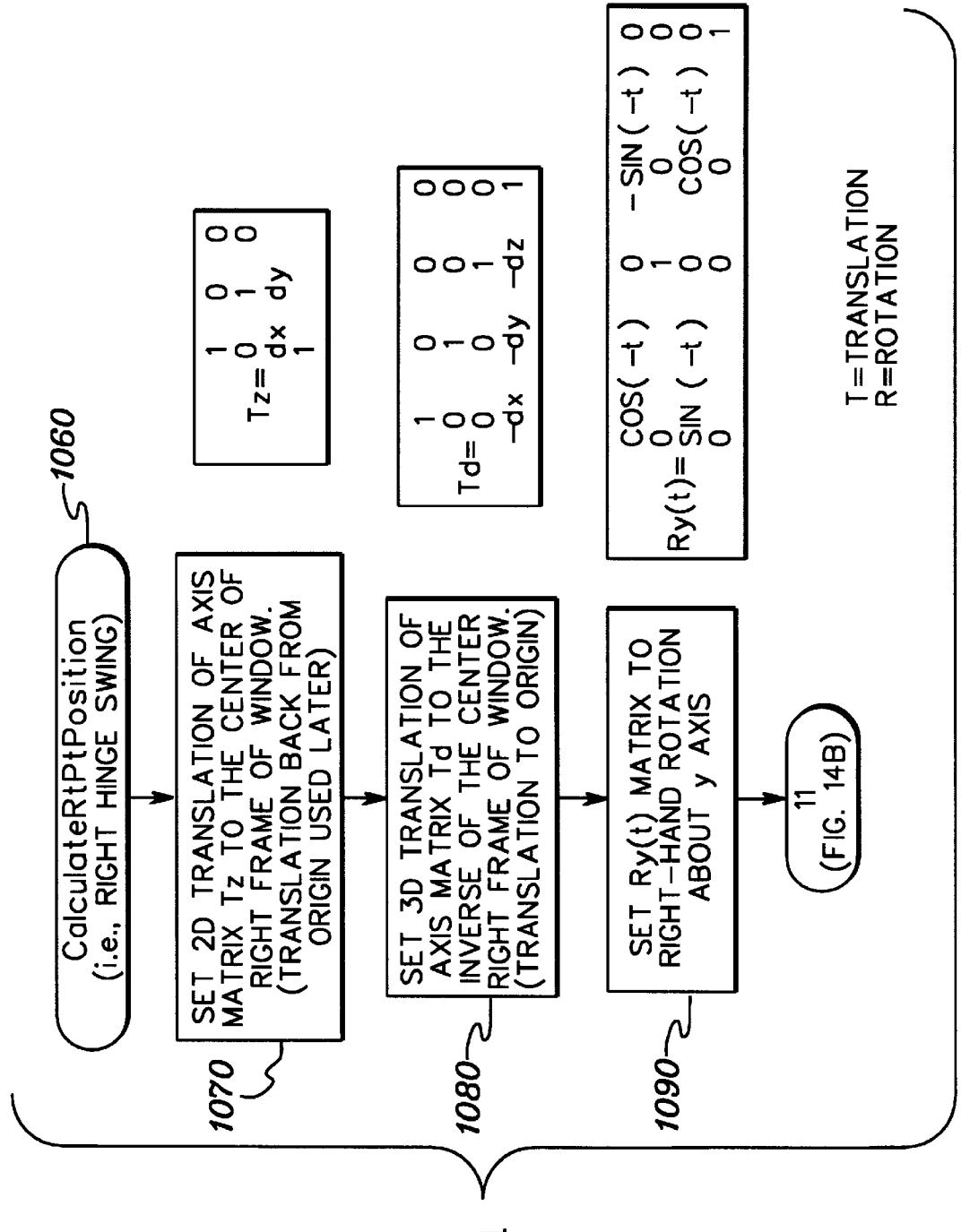

USER SELECTED DISPLAY OF TWO-DIMENSIONAL WINDOW IN THREE DIMENSIONS ON A COMPUTER SCREEN

CROSS-REFERENCE TO RELATED APPLICATION

This application is related to co-filed, commonly assigned United States patent application entitled "Display of Pointing Indicator Within Two-dimensional Window Displayed in Three Dimensions on a Computer Screen", Ser. No. 09/282,486, which is hereby incorporated herein by reference in its entirety.

TECHNICAL FIELD

The present invention relates generally to computer display systems, and more specifically, to a technique for interactively displaying a two-dimensional window in three dimensions on a display screen of the computer system to thereby enhance simultaneous presentation and monitoring of multiple windows.

BACKGROUND OF THE INVENTION

The usefulness of computer systems is directly related to a user's ability to communicate effectively and efficiently with the computer system. Central to this ability to communicate is the need to have a comprehensive display of images available to the user of work objects being operated upon in an interactive manner.

One approach at accomplishing this goal calls for overlapping segmented areas (herein "windows") of a display screen in much the same way as piling a stack of books on a desk. In this approach, the most recently used or "active" window appears on top (so that its view is not obscured by other windows) and the least recently used window appears on the bottom (such that its view is partially or fully obscured). A user is unable, using the known approaches, to use direct manipulation techniques to change the display images. For example, a user wishing to replace the current view (e.g., switch from an iconic view of a list to a textual view) of an object must either replace the current view or open a new window to a new view using multiple combinations of keyboard strokes or mouse manipulations in conjunction with menu bars.

Today's computing environments involving a human/computer interface center on the graphical user interface (GUI) style system described above. GUI systems all share a certain set of general characteristics. They all contain windows for the display of data and they all contain a keyboard and a pointing device for input. The keyboard and pointing device, usually a mouse, are used to enter data and to navigate about a GUI presentation screen. The GUI presentation screen contains multiple windows which the user can manipulate.

Common to all GUI systems is the underlying event-driven software structure. With the advent of GUI systems has come the proliferation of event-driven software tool kits and libraries. These tool kits and libraries provide a standard set of interfaces which programmers program to. Once applications are built on these GUI interfaces, all applications running with the same set of application programming interfaces (APIs) look and feel the same. For example, all International Business Machines' OS/2 Presentation Manager applications look and feel similar because all OS/2 programmers program to the Presentation Manager interfaces.

Window display systems allow more data to be displayed on the screen simultaneously compared with older single screen programs. This is because multiple windows can be opened at the same time and each window represents an application or a part of an open application. Unfortunately, a computer screen can become cluttered with too many open and overlapping windows. Consequently, what is needed is a technique for displaying multiple two-dimensional windows in distinct areas of the display screen, such that the multiple windows can be viewed at the same time and thereby allow a user to individually monitor and directly operate within the different windows. The present invention is directed to meeting this need.

DISCLOSURE OF THE INVENTION

Briefly summarized, the invention comprises in one aspect a method for displaying a window in a two-dimensional display screen. The method includes: providing at least one two-dimensional window for display in the two-dimensional display screen; and responsive to user input, displaying the at least one two-dimensional window in three dimensions within the display screen.

In another aspect, a computer display system is provided which includes a two-dimensional display screen for displaying one or more windows and a window manager overseeing display of the one or more windows within the display screen. The window manager is programed to display the at least one two-dimensional window in three dimensions within the two-dimensional display screen responsive to user input.

In a further aspect, a system for displaying a window in a two-dimensional display screen is provided. This system includes means for providing at least one two-dimensional window for display in the two-dimensional display screen, and means for allowing a user to designate the at least one two-dimensional window for display as a three-dimensional window within the display screen.

In a still further aspect, the invention comprises an article of manufacture which includes a computer program product comprising computer usable medium having computer readable program code means therein for use in displaying a window in a two-dimensional display screen. The computer readable program code means in the computer program product includes: computer readable program code means for causing a computer to effect providing at least one two-dimensional window for display in the two-dimensional display screen; and computer readable program code means for causing a computer to effect allowing a user to designate the at least one two-dimensional window for display as a three-dimensional window within the two-dimensional display screen.

To restate, this invention provides a technique for expanding the amount of data displayed on a computer monitor without changing the physical monitor size, thereby allowing a computer user to view and monitor more data than with a standard two-dimensional window display system employing an overlapping of windows. Presented herein is a technique to improve the quantity of information displayed on the computer screen without degrading the quality of the information displayed.

Conventionally, window display systems such as IBM's OS/2 Presentation Manager, the AIX/UNIX X-Window System, and other windowing display systems, display information two-dimensionally, with a more recently opened window overlying a previously opened window. Within these systems, windows have what is called a "Z order," but this is just the order in which the windows are stacked one upon the other.

Humans are accustomed to viewing information in three-dimensions. This means that the human mind can view images that are not perpendicular to the line of sight and still effectively process information. In fact, humans depend a great deal on peripheral information which accounts for much of the information we process. This invention describes a method/system for harnessing the human ability to view non-perpendicular data and mentally process the information effectively. The minds ability to fill in details based on a gross set of details lets humans process data that is not presented in an ideal perpendicular format. Described herein is a technique for displaying and manipulating three dimensionally (3D) projected data in a window display system. Advantageously, the technique presented does not require change to any existing application program. All modifications needed to display the window in 3D format may be implemented in the window display libraries and operating system, i.e., within the window manager.

BRIEF DESCRIPTION OF THE DRAWINGS

The above-described objects, advantageous and features of the present invention, as well as others, will be more readily understood from the following detailed description of certain preferred embodiments of the invention, when considered in conjunction with the accompanying drawings in which:

FIG. 14a & 14b illustrate one embodiment of the flow control, mathematic matrices, and mathematical operations used to display a point from a two dimensional window frame on to the users's screen as a three-dimensional swung point when the swing hinge is on the right edge of the window.

BEST MODE FOR CARRYING OUT THE INVENTION

Significant to the invention described herein is the ability to display more information on a user's display screen without increasing the physical size of the screen. This goal is achieved by employing the user's ability to view objects in a perspective manner and using an interactive approach for converting two-dimensional windows to three-dimensional display within the display screen.

Figure 1:
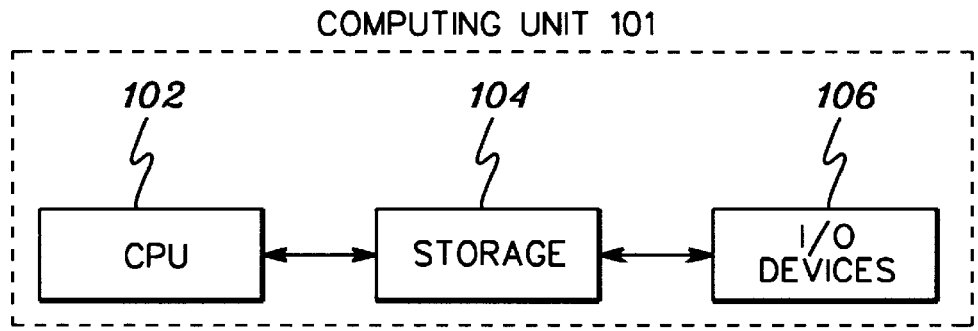
FIG. 1 is a block diagram of a data processing system to employ three-dimensional (3D) window display principles in accordance with the present invention.

One example of a computing environment incorporating and using the window arranging capabilities of the present invention is depicted in FIG. 1 and described below. In FIG. 1, a computing environment 100 includes, for instance, at least one cental processing unit 102, a main storage 104, and one or more input/output devices 106, such as a display screen, keyboard and mouse for user interaction with display data.

As is known, central processing unit 102 is the controlling center of computing unit 101 and provides sequencing and processing facilities for instruction execution, interruption action, timing functions, initial program loading, and other machine related functions. The central processing unit executes at least one operating system, which as known, is used to control the operation of the computing unit by controlling the execution of other programs, controlling communication with peripheral devices and controlling use of the computer resources. Associated with the operating system is a window manager which controls the display of information to a user on a display screen.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to one or more input/output devices 106. These devices include, for instance, a display screen, keyboard, pointing device, communication controller, teleprocessing device, printer, magnetic storage media (e.g., tape, disk), direct access storage devices, and sensor-based equipment. Data is transferred from main storage 104 to input/output devices 106 and from the input/output devices back to main storage.

In one example, computer environment 100 is a single system environment, which includes an RS/6000 computer system running an AIX operating system (RS/6000 and AIX are offered by International Business Machines Corporation). However, the invention is not limited to such an environment. The capabilities of the present invention can be incorporated and used within many types of computer environments and many types of computer systems. For instance, computer environment 100 can include any personal computer having a display screen and employing Microsoft's Windows windowing system, Apple's Macintosh windowing system, IBM's OS/2 Presentation Manager System, or a variety of X window systems. Other implementations are also possible and are considered part of the claimed invention.

Figure 2:
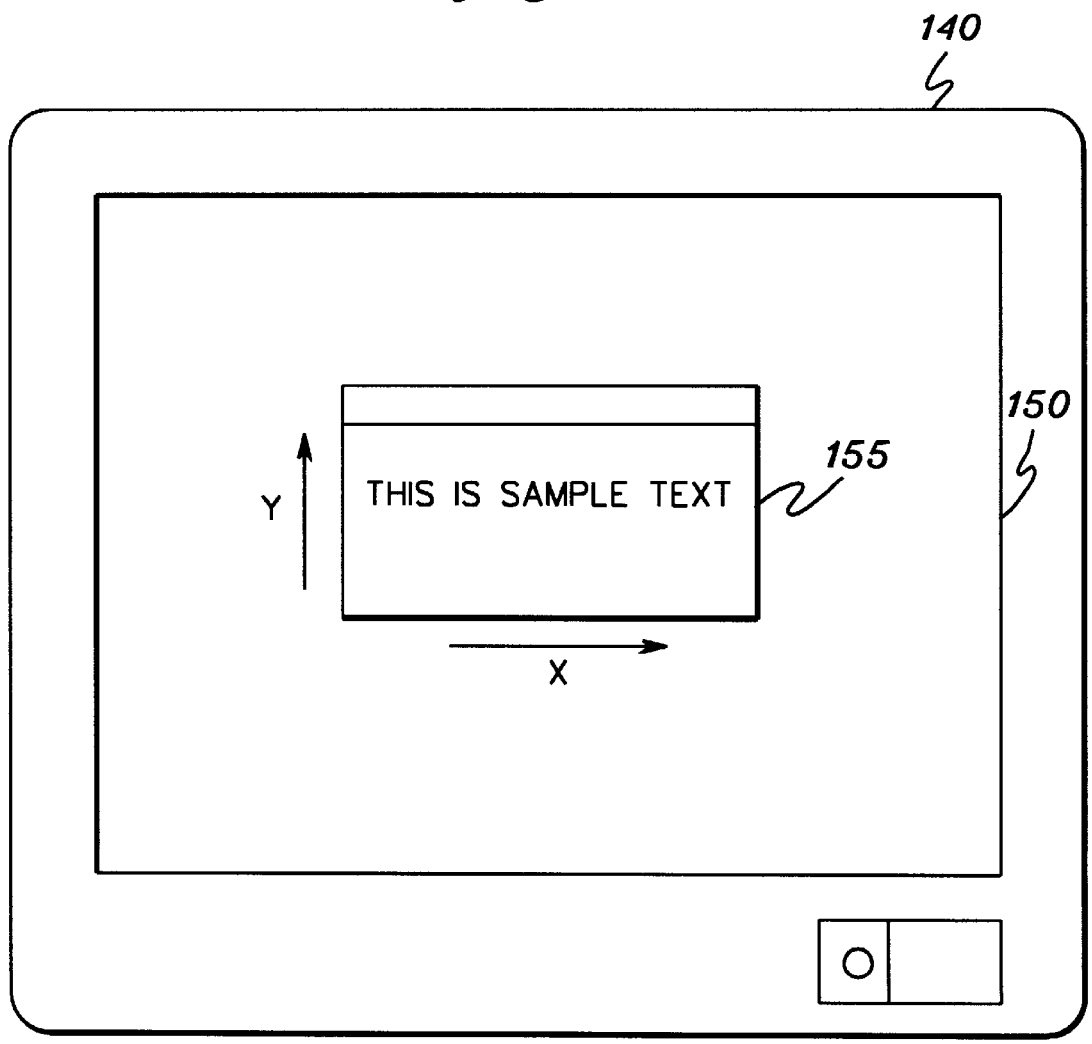
FIG. 2 is an illustration of a display screen with a basic two-dimensional (2D) window displayed therein.

FIG. 2 illustrates a typical rectangular window 155 within a display screen 150 of a computer workstation 140 having a conventional two-dimensional (2D) windowing system. Screen 150 may be of any conventional type, such as a cathode ray tube (CRT) display or a liquid crystal display (LCD). As is well known in the art, the image displayed on screen 150 is formed by a plurality of individual picture elements (pixels) that are spaced at regular intervals from one another and may be identified by their horizontal and vertical displacements x, y, respectively, from an origin, assumed here to be the lower left-hand corner of screen 150. Although the present invention is not limited to any particular resolution, a typical display resolution may be 1,024 pixels horizontally by 768 pixels vertically, in which case x ranges between 0 and 1023 and y ranges between 0 and 767. Each pixel is illuminated in accordance with a brightness signal for that pixel; typically, a color signal having a red (R), green (G) and blue (B) component. A 24-bit color signal may thus comprise three 8-bit components for the three constituent colors.

As shown in FIG. 2, in one common embodiment window 155 is a rectangular window with its edges parallel to the x and y axis of display 150 of workstation 140. Note that the edges in a typical window display system are displayed only in x y space, and do not have a z-space attribute.

Figure 3:
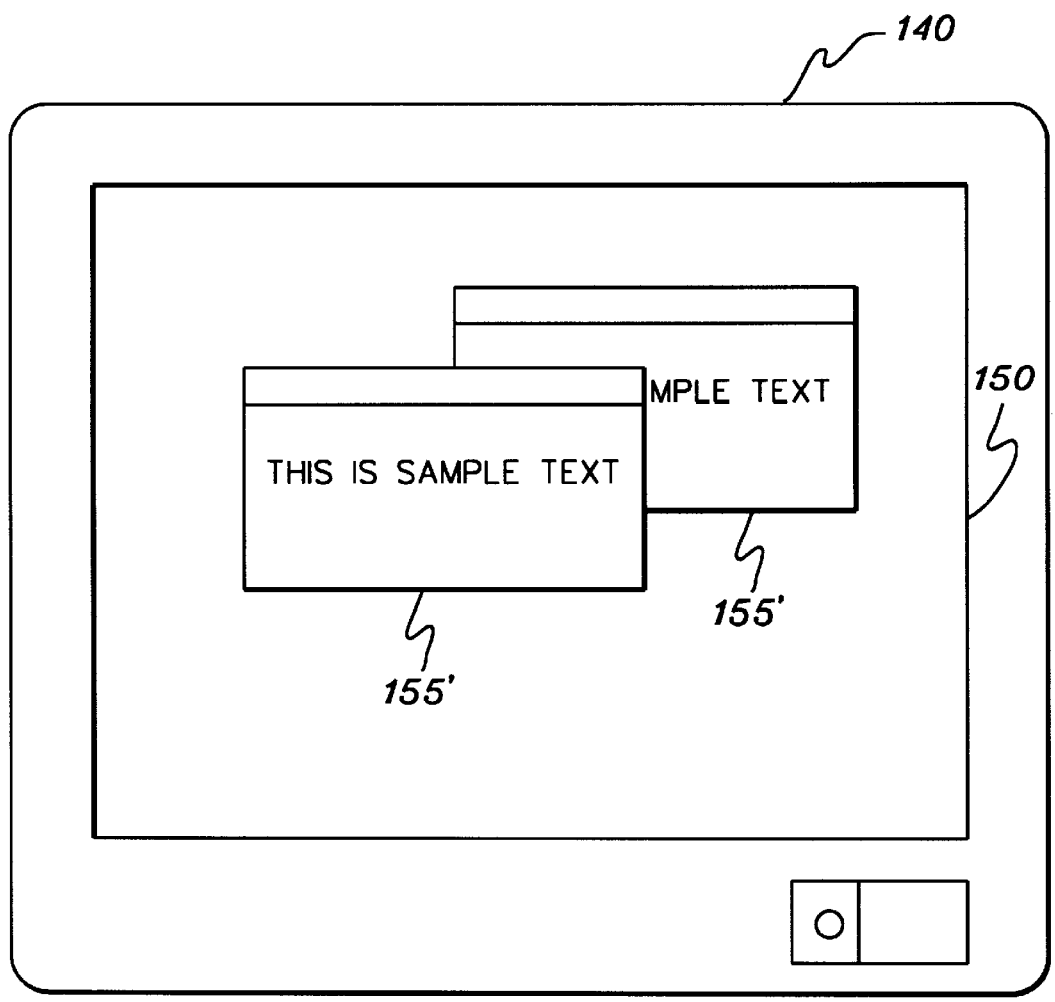
FIG. 3 is an illustration of a display screen showing two windows, one overlying the other in accordance with conventional GUI overlapping practice.

FIG. 3 depicts a new window 155' overlying window 155, with both being conventionally displayed within display screen 150 of computer workstation 140. As shown, at least a portion of original display window 155 is obscured by this overlying technique, wherein new window 155' overlies previously opened window 155. The solution to this problem is conceptionally straightforward. Rather than buying a larger monitor, which would require a large capital expense, a better approach for utilizing space within the display screen is needed. Thus, this disclosure presents a technique for increasing the quantity and quality of windows displayed in a window displaying system without changing any existing application program interface (API).

Figure 4:
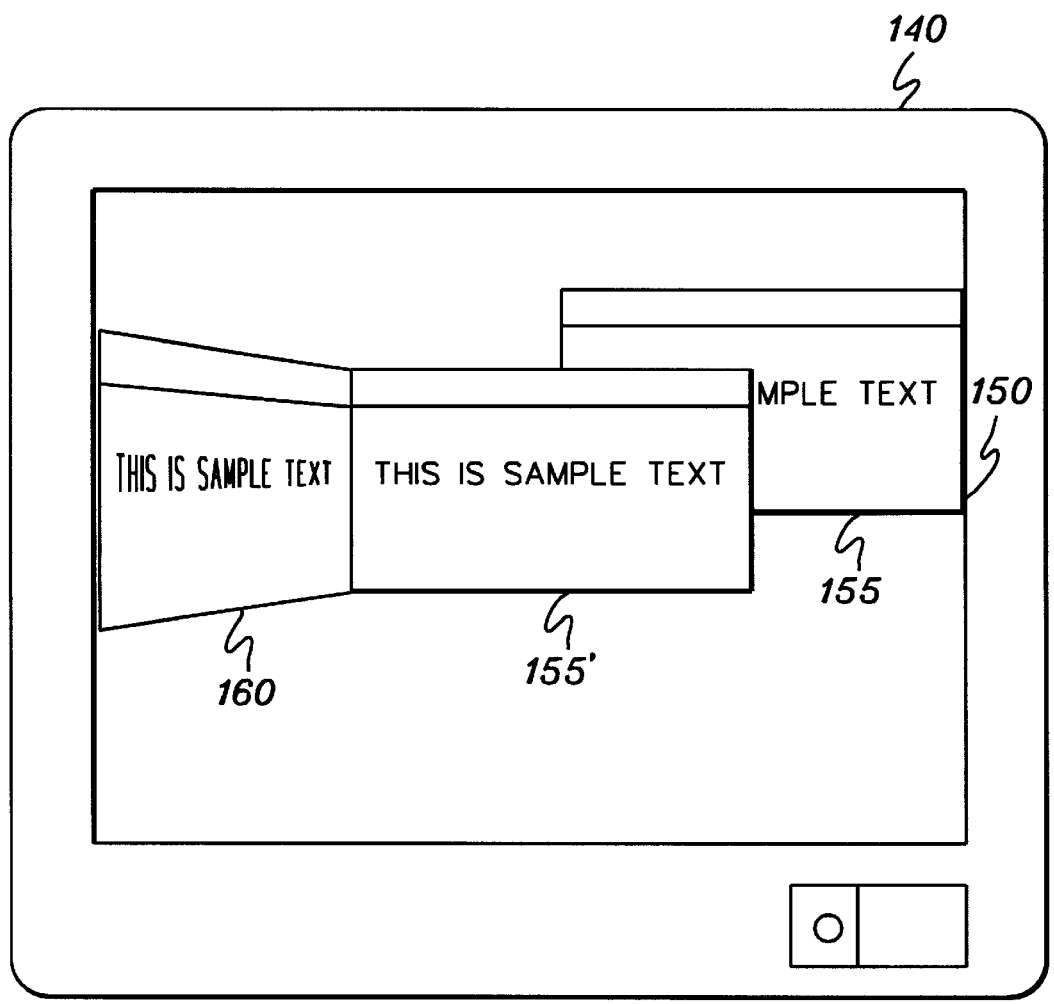
FIG. 4 is an illustration of a display screen having multiple windows, one of which is swung into three dimensions in accordance with the principles of the present invention.

In general, current window displaying systems only allow a user to position windows parallel to the x, y axis of the display screen. However, humans are used to viewing the world in other than such a level manner. Humans can read text or view text at angles other than those permitted with current window display systems. For example, as shown in FIG. 4, a user could just as easily read the text in the swung window 160 as the horizontal window 155'.

The swung window 160 is obtained in accordance with the principles of the present invention by allowing a user to interactively swing a two-dimensional window into a z axis of the computer screen by a desired amount. By changing the viewing angle of the window, more information can be displayed within a fixed size display screen 150 of the workstation 140. The actual screen area required by a window rotated on the z axis is clearly less than the window area required if there is no z axis rotation. Advantageously, since humans commonly process three-dimensional visual information, a user will picture the rotated window as a full size window. Thus, the z axis rotated windows presented herein use less screen space, but appear to the user as a full size window.

Conventionally, a windowing system functions to display information on a window screen. The windowing system may be called by an application program and the application program, through use of the windowing system, maintains an internal representation of the user window on the user screen. The data for the window may be maintained as an array of pixels or points stored in a control data structure. Normal window processing involves the transfer of the pixels in the storage area to the video screen memory of the display unit. Once the video screen memory has been updated, video hardware uses the array or bitmap of pixels to display an image on the user's screen.

Implementation of three-dimensional (3D) windowing in accordance with the principles of the present invention involves intercepting the data transfer of a window image from the control data structure to the screen memory. Two-dimensional to three-dimensional conversion then occurs for each point of the 2D window. This conversion includes, in one example, (1) translating the two-dimensional point to the origin based on its proximity to the center of the window frame used as the axis of rotation;

(2) rotating the point about the x or y axis into z-space using an angle θ as the rotation amount;

(3) obtaining the perspective view of the window based on a predefined user distance (e.g., approximately 17 inches) from the screen, the perspective point lying on the z axis and the z axis extending from the center of the view screen; and (4) translating the two-dimensional perspective point back to where the two-dimensional window had been located on the view screen.

Once all the points have been processed for a window, a new two-dimensional window bitmap has been created which contains a perspective view of the three-dimensional rotated window. The new two-dimensional bitmap is smaller than the original, and thereby consumes less screen space.

Windows that are displayed underneath the three-dimensional window display more information because the three-dimensional swung window does not take up as much screen space. All keyboard and mouse events are processed by delivering the events to the existing two-dimensional processing. The two-dimensional processing will then change the two-dimensional screen to include the updates from the mouse movement or keyboard events. The changes to the two-dimensional screen are processed through the two dimensional to three-dimensional conversion operation described further hereinbelow and the mouse and/or keyboard events are shown on the display in 3D perspective format.

The current standard for window display systems is to either use a pointing device such as a mouse to size a window or to pull down the main control box for a window and select the "size" option to size a window. The subject invention could be implemented in a number of ways. For example, the invention could be implemented by expanding the existing "size" option on the main control box to include sizing on the z axis as well as the existing (x, y) axis sizing. Alternatively, the present invention could be implemented by expanding the current drag technique of sizing the window in the x, y plane to a three-dimensional drag function. For example, by depressing both mouse buttons (commonly known as the "third mouse button") and dragging a window edge, it is possible to change the z axis orientation of a window. It is this later implementation that is presented herein below as one detailed embodiment of the present invention. However, those skilled in the art will recognize that other implementations are possible without departing from the scope of the claimed invention.

Figure 5:
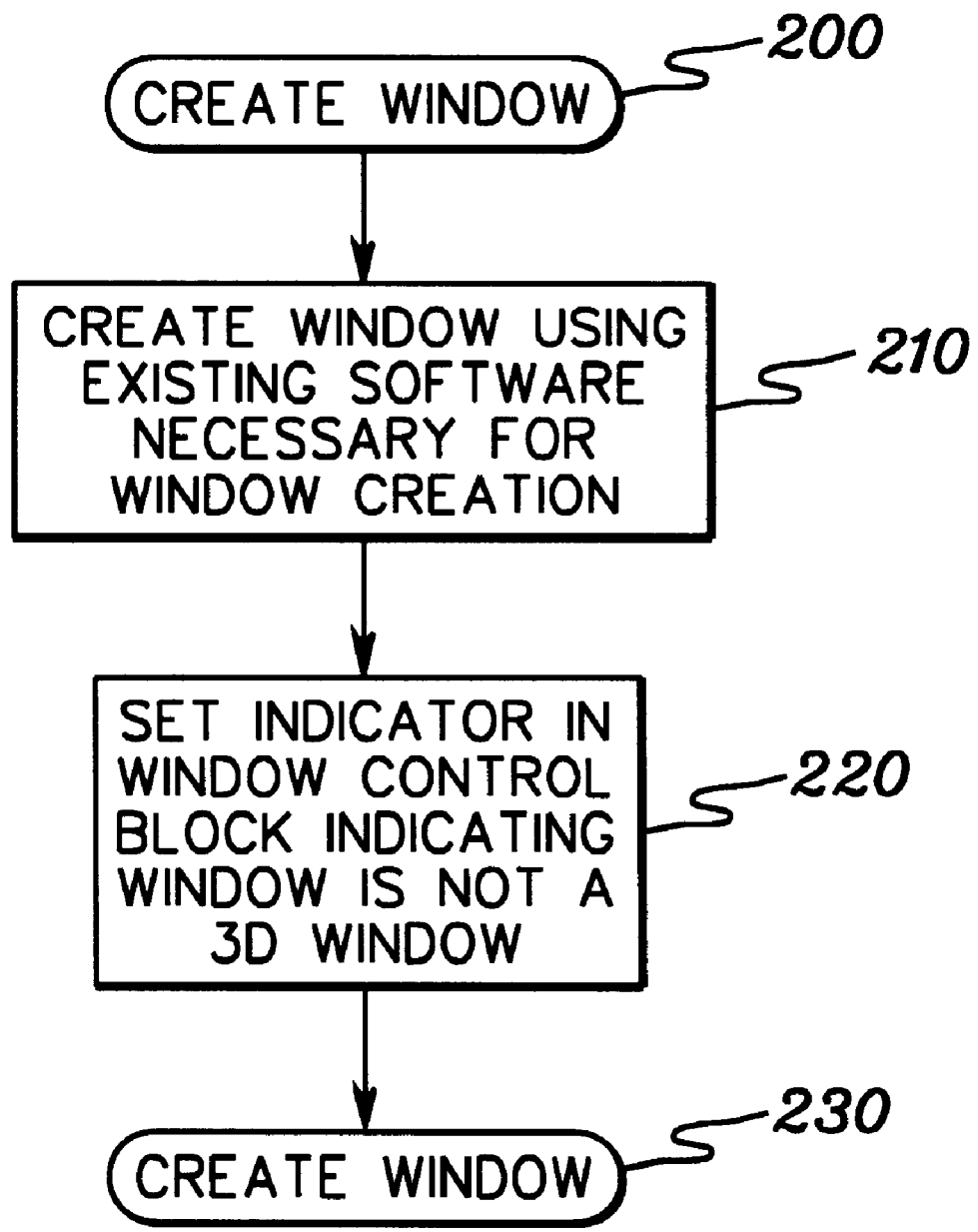
FIG. 5 is a flowchart implemented within a window manager in accordance with the present invention, used to create a window for display, and showing the addition of a two dimensional/three dimensional (2D/3D) indicator within the window's window control block.

FIG. 5 depicts a flowchart of one embodiment of a create window routine 200 wherein the window is created using existing software necessary for window creation 210. Since in accordance with the present invention a window may be either a two-dimensional window or a three-dimensional swung window, the window control block is modified to include an indicator as to whether the newly created window is a two-dimensional window or a three-dimensional window. This indicator is set in the window control block for the window being created 220. Once the window is created, processing returns to the calling application 230.

Figure 6:
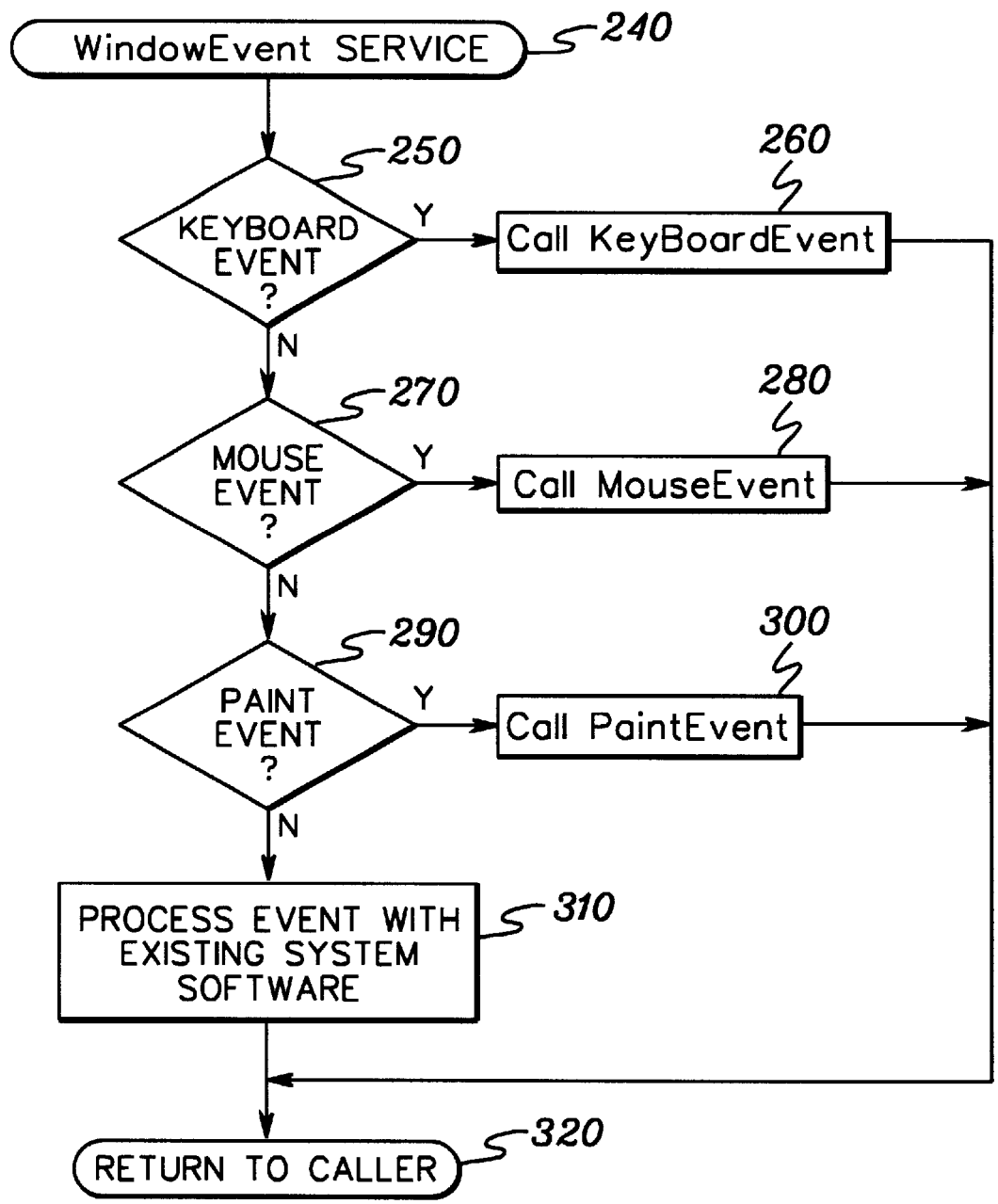
FIG. 6 is a flowchart of one embodiment of a window event service routine in accordance with the principles of the present invention.

FIG. 6 depicts a window event service routine 240 which again is assumed to be implemented within the window manager. The operating system would have a similar parallel event process for implementation whenever an event occurs on the system. Process 240 begins by inquiring whether the event is a keyboard event 250, and if so, processing calls a keyboard event routine 260, one embodiment of which is described below with reference to FIG. 7. If the event is not a keyboard event, processing inquires whether the event is a mouse event 270, and if yes, a mouse event routine is called 280. One embodiment of mouse event processing in accordance with the principles of the present invention is presented in FIGS. 8a–8c. If the event is not a mouse event, processing determines whether the event is a paint event 290. (As understood by one skilled in the art, a paint event is synonymous with a display of the window or refreshing of the window.) If so, then a paint event routine is called 300. One embodiment of the paint event routine is depicted in FIGS. 10–15b, and described below.

If the event comprises other than a keyboard event, mouse event, or paint event, then conventional event processing is performed using existing system software 310; i.e., there are no changes pursuant to the invention to the event processing otherwise performed. Once the keyboard event, mouse event, or paint event has been intercepted and processed as described below, processing flow returns to the point of call 320.

Figure 7:
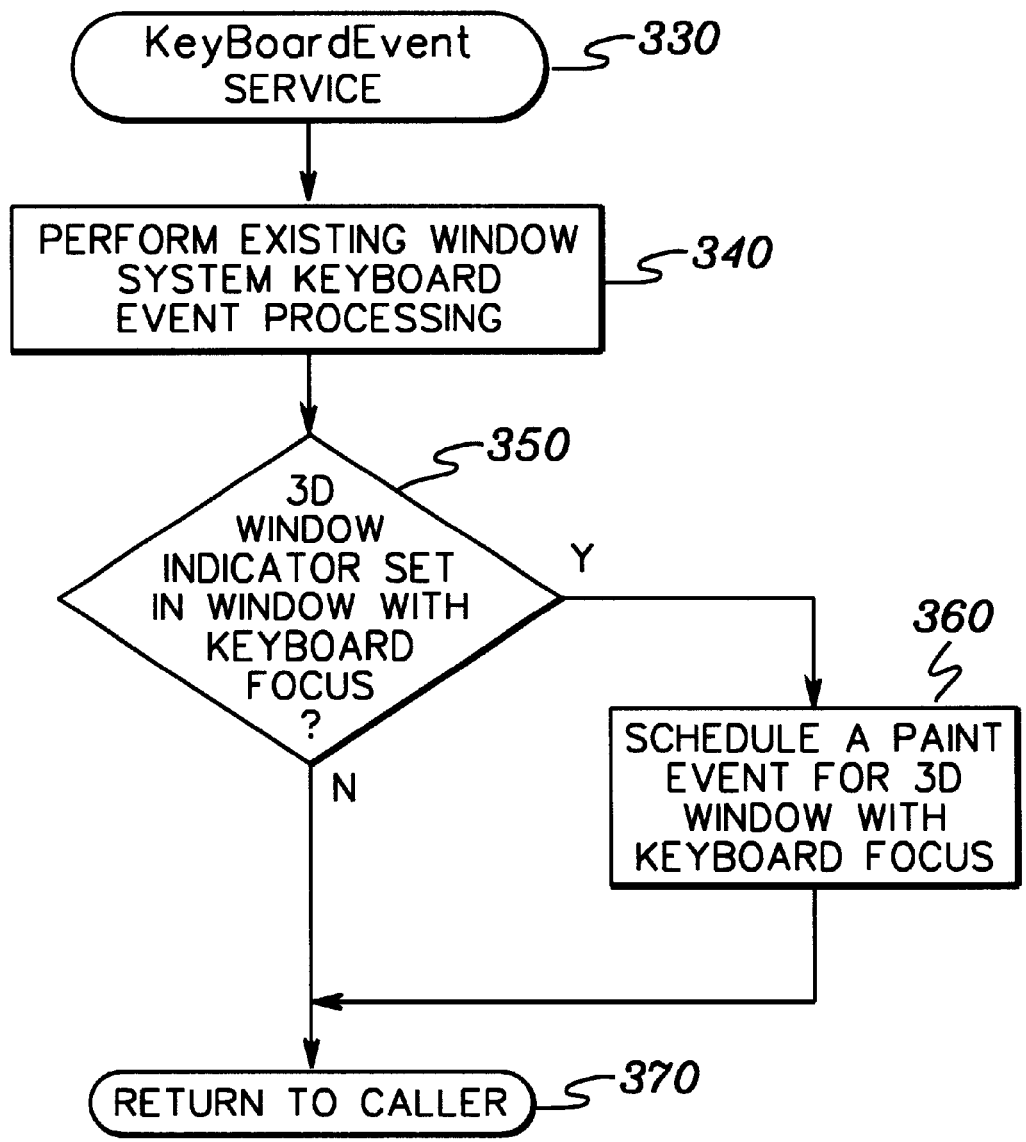
FIG. 7 is a flowchart of one embodiment of a keyboard event service routine in accordance with the principles of the present invention.

FIG. 7 depicts a keyboard event service 330 in accordance with the principles of the present invention. If the event comprises a keyboard event, then the event is processed using existing window system keyboard event processing within the window manager 340. After processing the event, determination is made whether the 3D window indicator is set for the window having the focus of the keyboard 350. The window having the focus of the keyboard comprises that window of the display screen where the keyboard event occurs. If the 3D window indicator is set for that window, then a paint event is scheduled for the window for display in three dimensions 360. After painting the 3D window, or if the 3D window indicator is not set, processing returns to the caller 370.

Figure 8A:
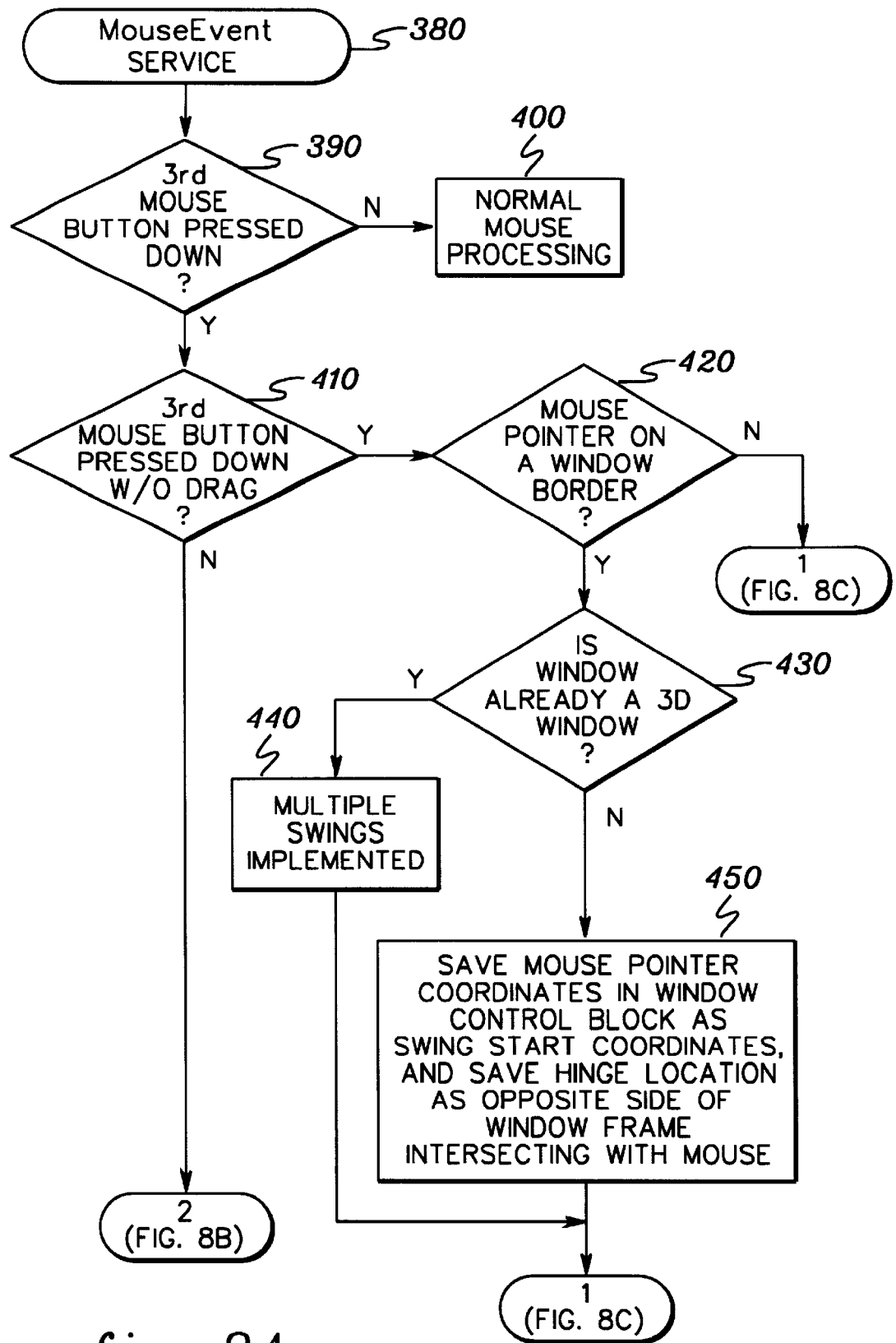
FIGS. 8a, 8b & 8c are a flowchart of one embodiment of a mouse event service routine in accordance with the principles of the present invention.
Figure 8B:
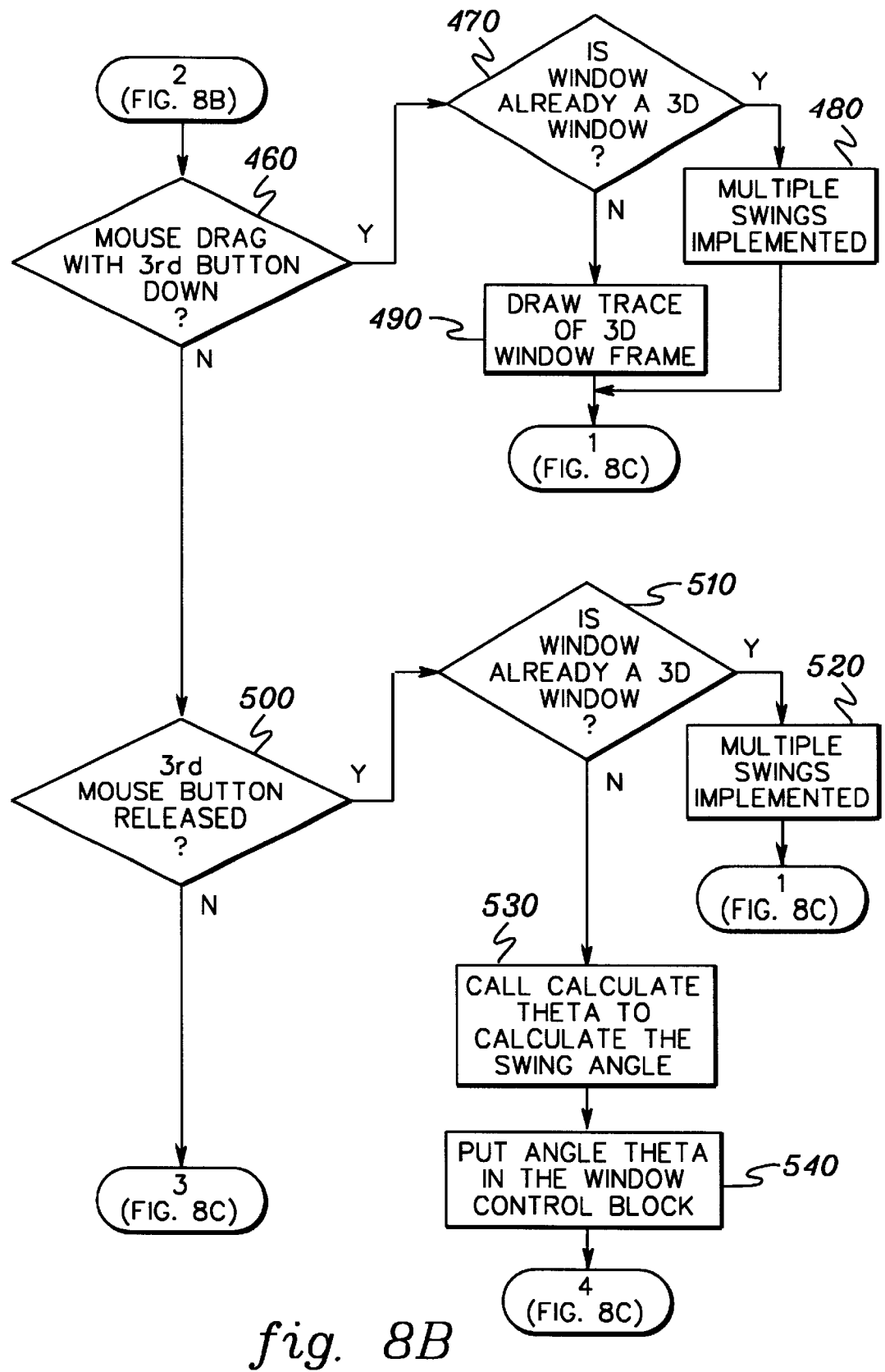
Figure 8C:
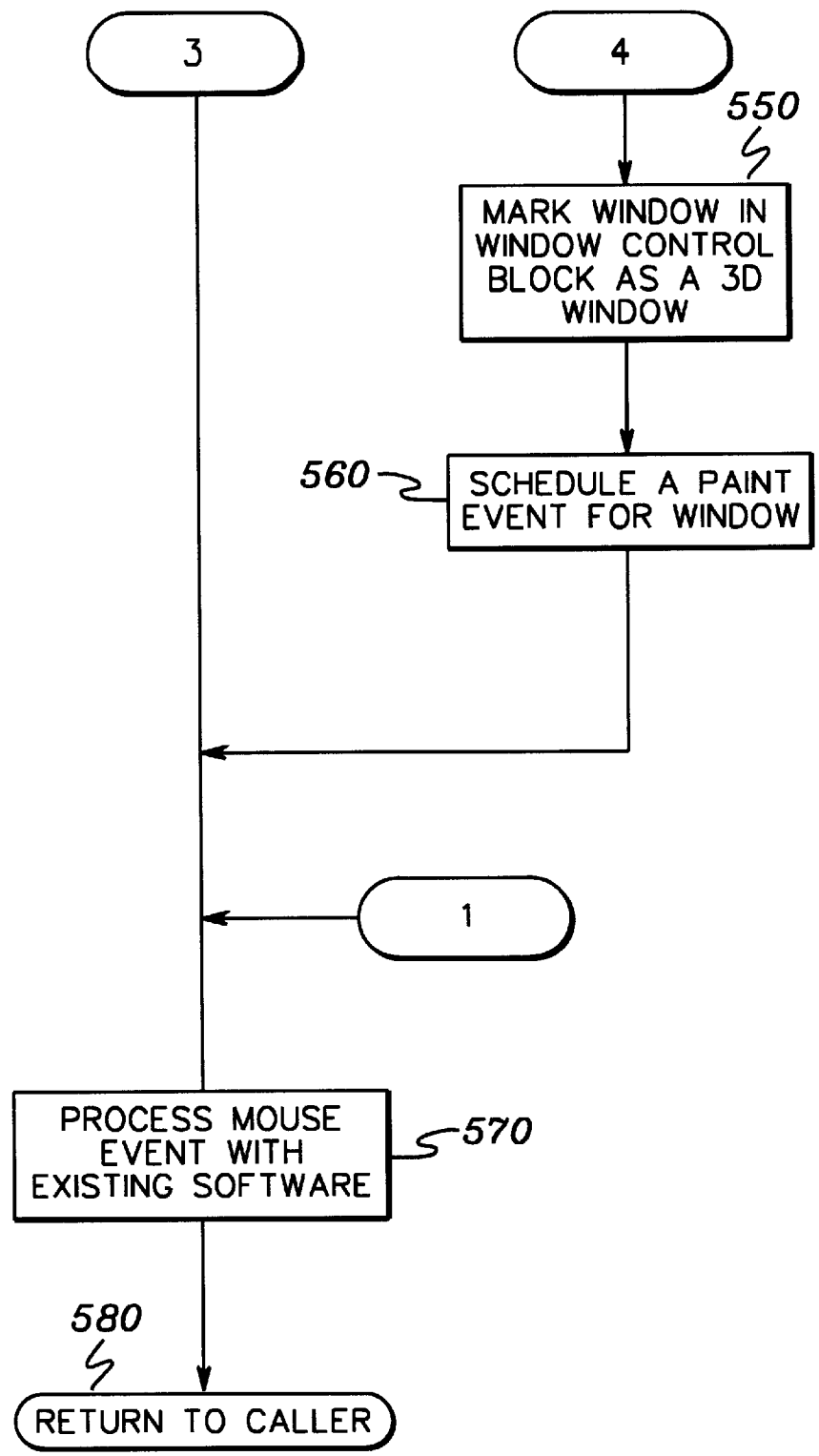

FIGS. 8a–8c depict a mouse event service 380 in accordance with the principles of the present invention. Initially, processing determines whether the mouse event comprises the third mouse button being pressed down 390, and if no, then normal mouse processing 400 within the window manager is performed. If the third mouse button is pressed down, then processing determines whether the third mouse button was pressed without the user dragging the mouse 410, and if yes, whether the mouse pointer is on a window border 420. If not, the mouse event is processed using existing window manager software 570 (FIG. 8c) and the process returns to the point of call 580.

If the mouse pointer is on a window border, also referred to herein as a window frame edge, then processing inquires whether the window is already a 3D window 430. If the window is already a 3D window, then provision can be made to allow for an additional swing of the window 440 or, alternatively, an error code could be set to indicate that multiple swings are not supported. Although not described herein in detail, implementation of multiple 3D swings is believed straightforward to one skilled in the art based upon the description provided herein and known graphics and 3D imaging techniques. (See, e.g., Foley and Van Dam, *Computer Graphics: Principles and Practice*, an Addison-Wesley Systems Programming Series publication (1990).)

Assuming that the window is not already a 3D window, then the mouse pointer coordinates are saved in the window control block as the swing start coordinates and the opposite edge of the window frame edge intersecting with the mouse is saved as the hinge location for pivoting of the two-dimensional window into a three-dimensional representation as described below 450. Thereafter, the mouse event is processed using existing window manager software 570 (FIG. 8c) and the process returns to the point of call 580.

From inquiry 410, if "no", processing determines whether the user has dragged the mouse with the third mouse button pressed down 460 (FIG. 8b). If yes, inquiry is made to whether the window is already a 3D window 470. If the window is already displayed in three dimensions, then multiple swings processing is implemented 480 or, alternatively, an error code could be issued as described above. Assuming that the subject window is in two dimensions, then a trace of the 3D window frame is drawn 490. For example, as the mouse is dragged by a user, the 3D trace of the window can be displayed in response to movement of the mouse as explained below. After tracing the 3D window, or if the subject window is already in 3D format, after implementing multiple swings, the mouse event is processed using existing software 570 (FIG. 8c) and control returns to the caller 580.

If the mouse event comprises release of the third mouse button, then from inquiry 500 processing determines whether the subject window is already in three dimensions 510, and if "yes", implements multiple swings processing or issues an error code 520 as described above. The mouse event is then processed using existing software 570 (FIG. 8c). Assuming that the subject window is in two dimensions and is being converted to three dimensions, then a swing angle θ is calculated by calling a calculate θ routine 530. As described further below, angle θ comprises in one embodiment the swing angle which defines the angle at which the two dimensional window is to be projected so as to appear three dimensional relative to a flat two-dimensional presentation of the window. The calculate θ routine is described further below with reference to FIGS. 9a & 9b.

Continuing with FIG. 8b, after calculating the swing angle θ, processing places angle θ in the window control block for the window frame 540 and marks the window as a 3D window 550 in the window control block. Thereafter, a paint event is scheduled for the window 560 and the balance of the mouse event is processed in accordance with existing software 570, after which return is made to the caller 580.

Figure 9A:
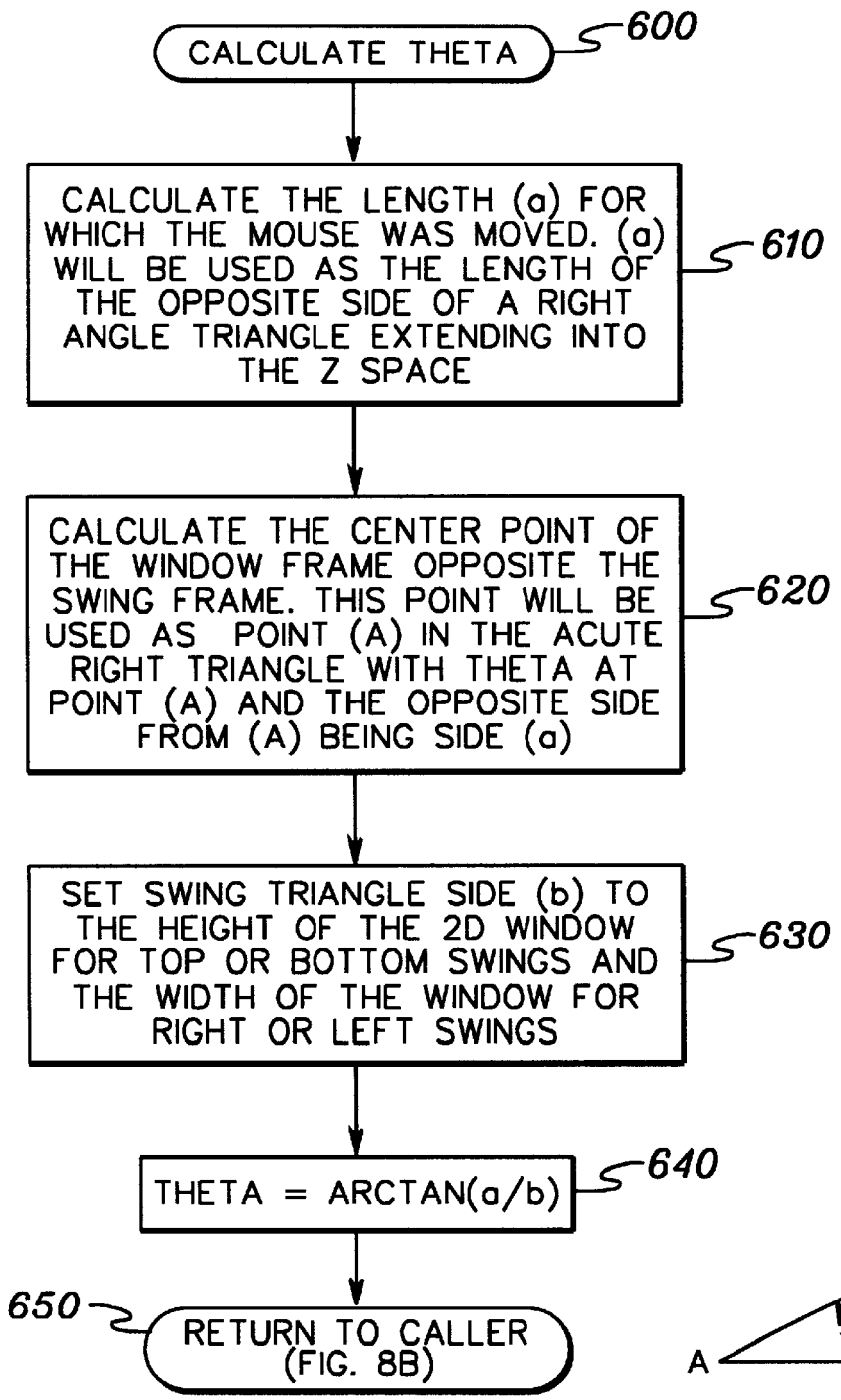
FIG. 9a is a flowchart of one embodiment of a process for calculating swing angle θ in accordance with the principles of the present invention for swinging a two-dimensional window frame for display as a three-dimensional window frame.
Figure 9B:
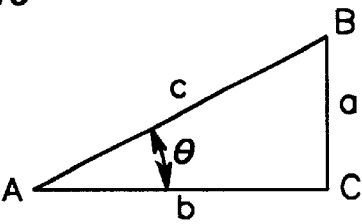
FIG. 9b is a representation of the swing angle θ employed in swinging a two-dimensional window frame for display in three dimensions in accordance with the principles of the present invention.

FIGS. 9a & 9b depict one embodiment of a process for calculating angle θ 600. Generally stated, angle θ is calculated using the distance that a user moves a mouse, and the size of the subject window, along with trigonometric functions. With reference to FIG. 9b, a length 'a' is determined as the length the mouse is moved and is used as the length of the opposite side of a right angle triangle extending into z-space from the plane of the display screen 610. The display screen can be thought of as co-planar with edge b of the triangle depicted in FIG. 9b. Note that length a is determined by the magnitude of the distance by which the mouse is dragged by the user, irrespective of direction.

Next, the center point of the window edge opposite to the swing frame edge 620 is determined. The swing frame edge comprises that edge of the window frame that the user has selected. For example, in FIG. 9b, it is assumed that the user selects the right frame edge of a two-dimensional window displayed in the plane of line b such that the opposite frame edge of the two-dimensional window comprises an edge passing through point A. This point A is used as the point in the acute right triangle (FIG. 9b) with θ at point A and the opposite side from A being side a. Next, the swing triangle side b is set to the width of the window frame for right or left edge window swings or to the height of the window frame for top or bottom edge swings 630. The formula θ=arctan (a/b) is used is calculate the swing angle θ.

Figure 10:
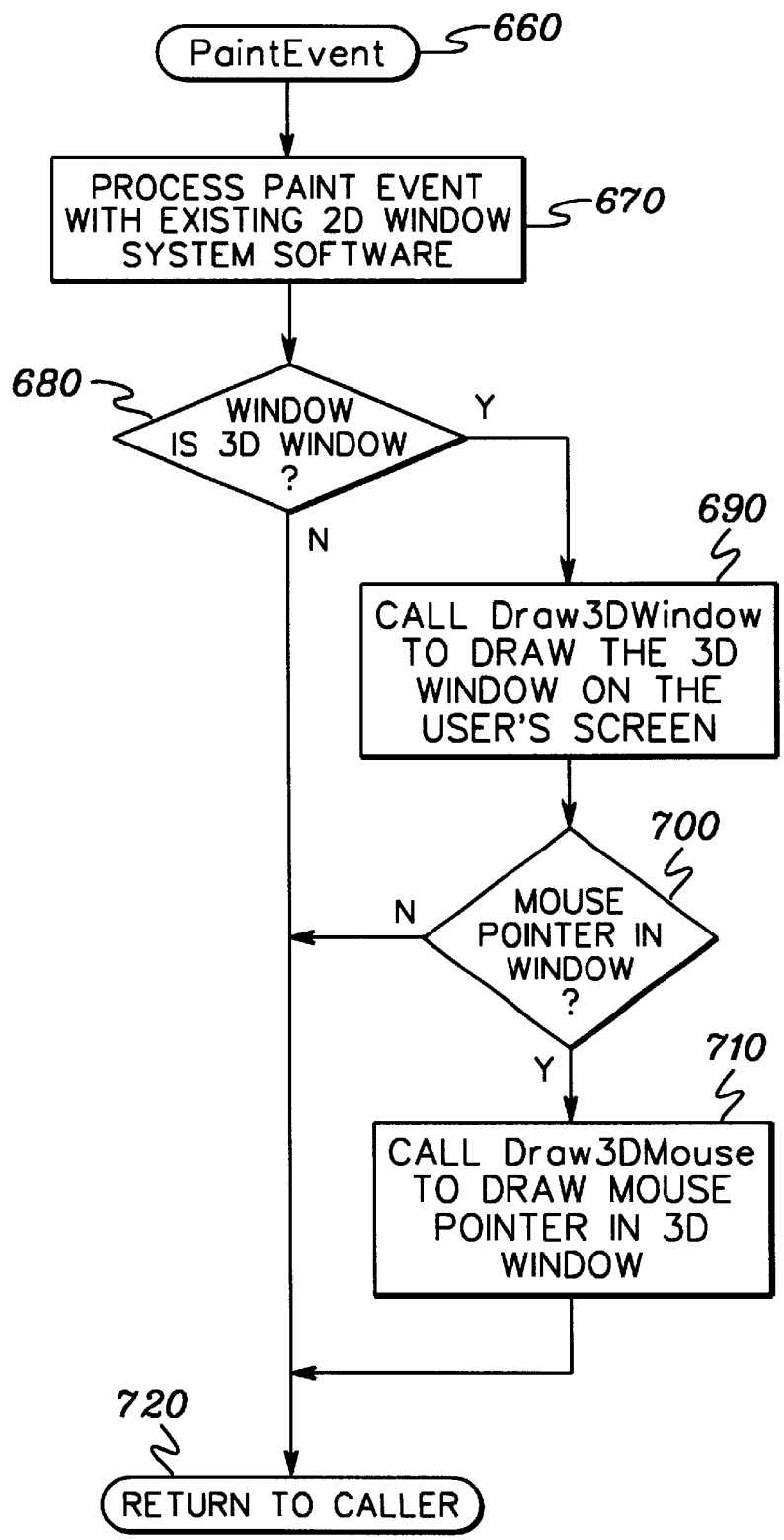
FIG. 10 is a flowchart of one embodiment of a paint event process in accordance with the principles of the present invention.
Figure 11A:
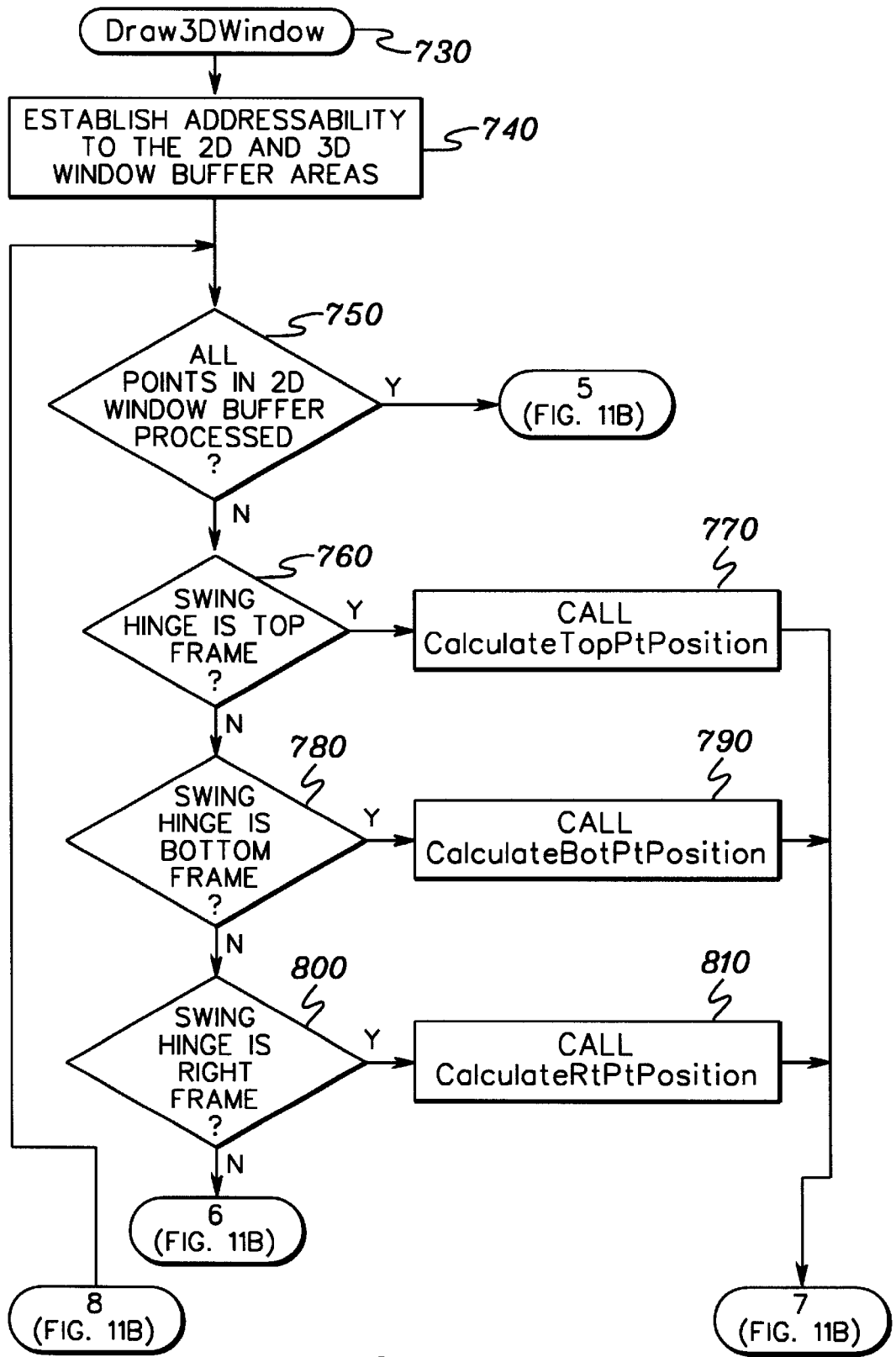
FIGS. 11a & 11b are a flowchart of one embodiment of a draw 3D window process in accordance with the principles of the present invention.
Figure 11B:
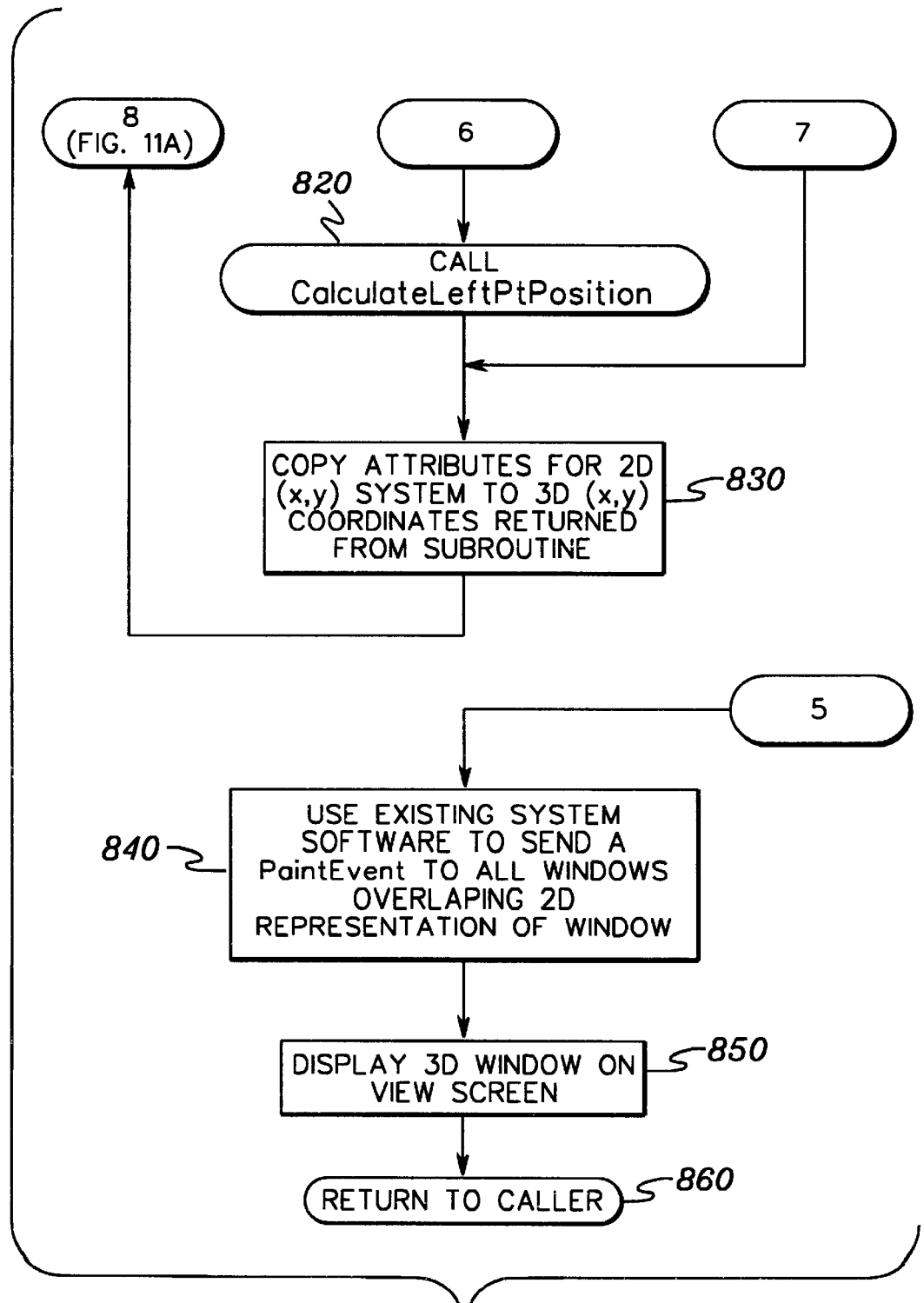

FIG. 10 depicts one embodiment of paint event processing 660 in accordance with the principles of the present invention. This subroutine processes paint events from the system manager involving the window. The paint event subroutine is where the present invention is in large part implemented for 3D windowing. Initially, the paint event is processed using existing two-dimensional window systems software 670, after which processing determines whether the window is to be displayed as a 3D window 680. If yes, then processing calls a draw 3D window subroutine to draw the 3D window on the user screen 690. One embodiment of the draw 3D window subroutine is depicted in FIGS. 11a & 11b and described below. After drawing the 3D window, processing determines whether the mouse pointer is within the bounds of the 3D window 700. If "yes", then the routine in the above-incorporated, co-filed and commonly assigned U.S. Patent Application entitled "Display Of Pointing Indicator Within Two-Dimensional Window Displayed In Three Dimensions On A Computer Screen" is employed to draw the mouse pointer within the 3D window 710. After drawing the mouse pointer within the 3D window, or if the mouse pointer is outside the 3D window, then processing returns to the calling application 720.

One embodiment of draw 3D window processing 730 in accordance with the present invention is depicted in FIGS. 11a & 11b. Processing begins by establishing addressability to the two-dimensional and three-dimensional window buffer areas 740 which comprise memory areas that will contain the bitmaps for the before and after mapping of the window being processed. The draw 3D window processing revolves around a loop beginning with inquiry 750, which determines whether all points in the two-dimensional buffer have now been processed. If "yes", then existing system software is used to send a paint event to all windows overlapping the two-dimensional representation of the window 840, after which the three-dimensional window is displayed on the view screen 850 and processing returns to the calling application 860. By scheduling a paint event to all windows that overlapped the current window, it is assured that all the screen space that is available will be used by the underlying windows. The perspective view of the subject window frame will allow underlying windows to appear more visible in the display screen.

Figure 12A:
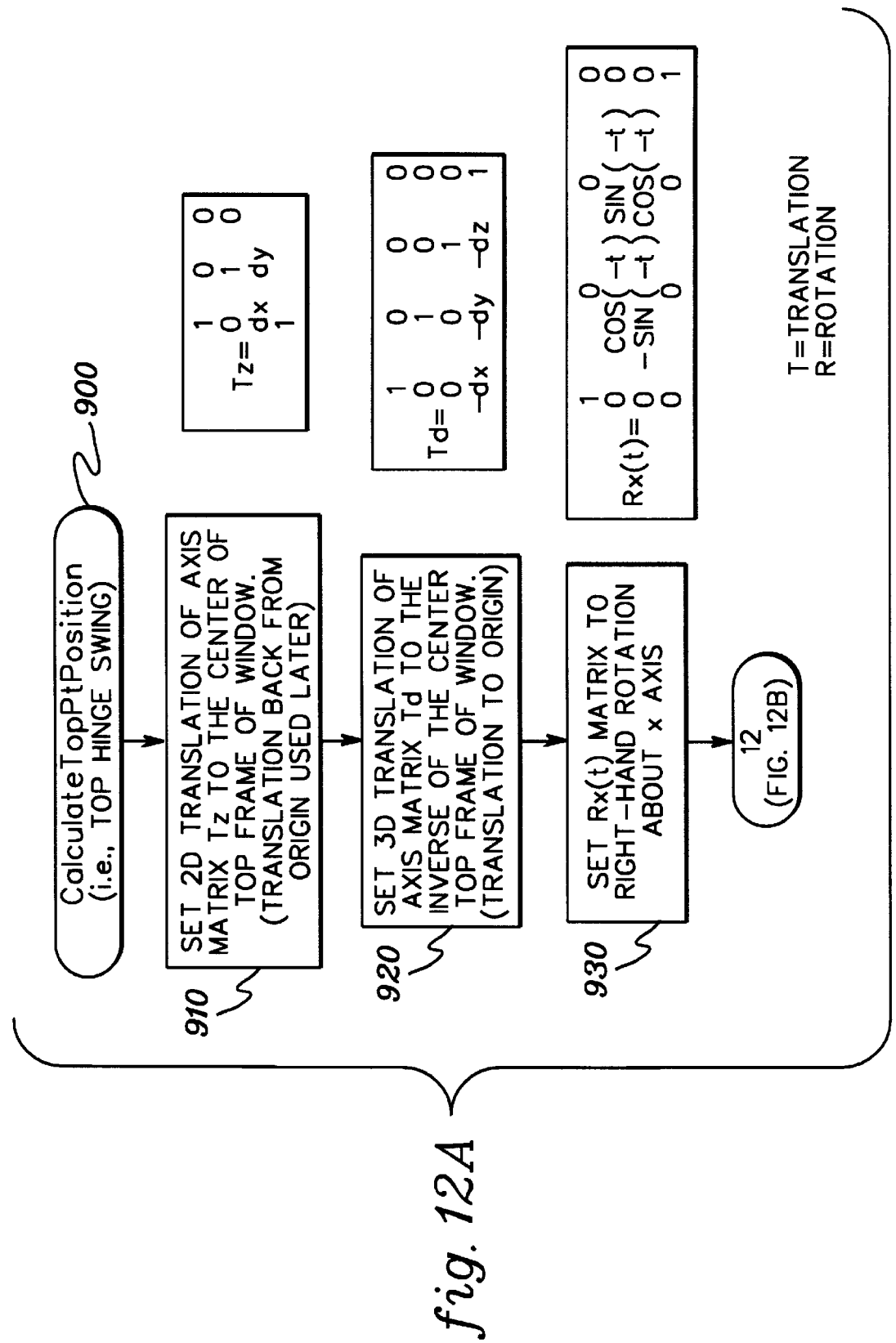
FIG. 12a & 12b illustrate one embodiment of the flow control, mathematic matrices, and mathematical operations used to display a point from a two-dimensional window on to the user's display screen as a three-dimensional swung point in accordance with the principles of the present invention when the swing hinge is on the top edge of the window.
Figure 12B:
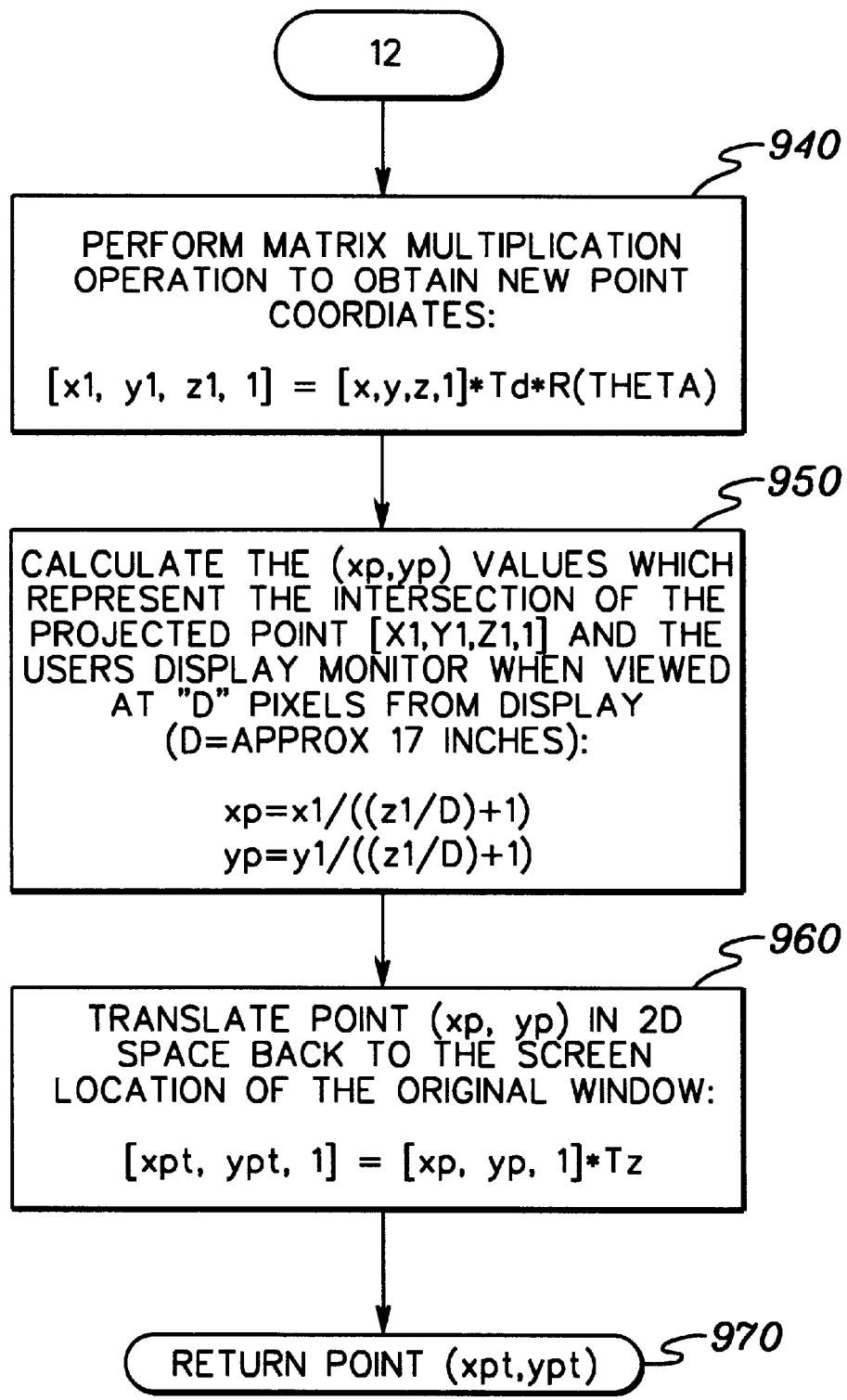

Assuming that all points in the two-dimensional window buffer have not been processed, then the main loop is entered and processing determines whether the window's swing hinge is a top frame edge 760, a bottom frame edge 780, a right frame edge 800, or a left frame edge. If the swing hinge is a top frame edge, then a subroutine call is made to calculate the top point position for a top hinge swing. This processing is depicted in FIGS. 12a & 12b and described further below. An analogous process is performed depending upon whether the swing hinge is the bottom frame edge, right frame edge, or left frame edge of the rectangular window frame. If the hinge is the bottom frame edge, then a calculate bottom point position routine is called 790; if the swing hinge is the right frame edge, then a calculate right point position subroutine 810 is called; or if the swing hinge is the left frame edge, a calculate left point position subroutine 820 is called. Embodiments of the calculate bottom point position routine, calculate right point position routine, and calculate left point position routine are depicted in FIGS. 13a & 13b, 14a & 14b, and 15a & 15b, respectively.

Once again, the goal of the draw 3D window subroutine is to take each one of the 2D points and use a mathematical operation to construct a 3D window that has been swung into the z-space of the display screen, and then use perspective viewing to view it. This perspective view of the widow is translated to the location that the window occupied prior to the mathematical operation. The goal of the draw 3D subroutine is to process each one of the 2D points individually. After each one of these points is translated, processing copies the attributes for the 2D (x, y) system to 3D (x, y) coordinates returned from the subroutine 830. Again, the process repeats for each point, i.e., pixel, in the 2D window frame.

FIGS. 12a & 12b depict one embodiment for determining the top hinge swing position of a point 900. Processing beings by setting the 2D translation of the axis matrix Tz to the center of the top edge of the window 910 (with the mathematical matrix Tz shown to the right of instruction 910). Note that translation back from the origin is implemented later in the routine. Next, the 3D translation of the axis matrix Td is set to the inverse of the center of the top frame edge of the window 920 (with the mathematical matrix Td shown to the right of instruction 920 in FIG. 12a). The matrix Rx(t) is set to right-hand rotation about the x axis 930 (with the mathematical matrix Rx(t) depicted to the right of instruction 930).

Next, a matrix multiplication operation is performed to obtain the new point coordinates 940 as shown in FIG. 12b. The xp, yp values are then calculated 950. These values represent the intersection of the projected point [x1, y1, z1, 1] and the user's display monitor when viewed at "D" pixels from the display. In one example, "D" is assumed to be approximately 17 inches. The point xp, yp is then translated in 2D space back to the screen location of the original window 960 and the translated point (xpt, ypt) is returned 970.

Figure 13A:
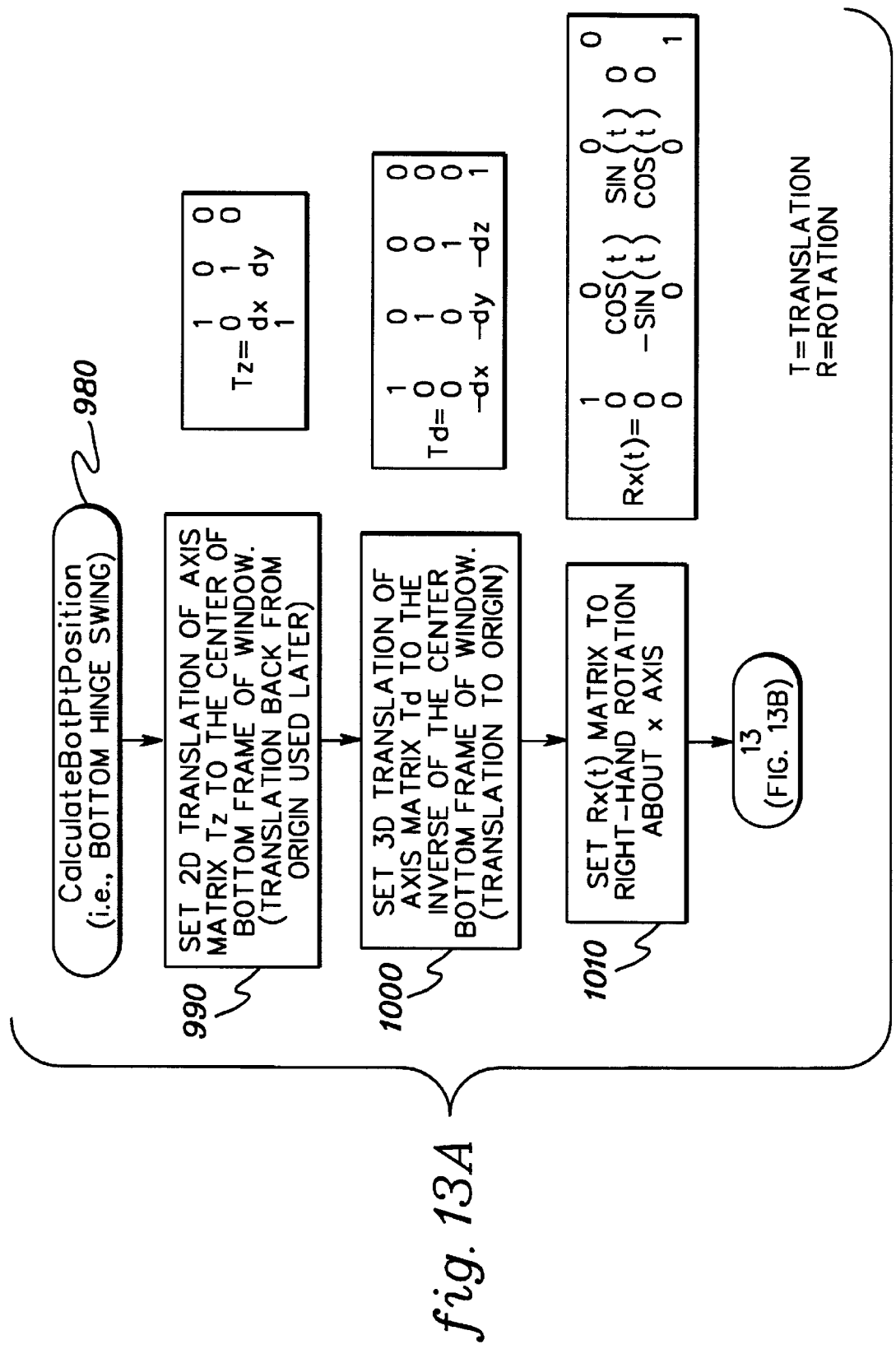
FIG. 13a & 13b illustrate one embodiment of the flow control, mathematic matrices, and mathematical operations used to display a point from a two-dimensional window on to the user's display screen as a three-dimensional swung point when the swing hinge is on the bottom edge of the window.
Figure 13B:
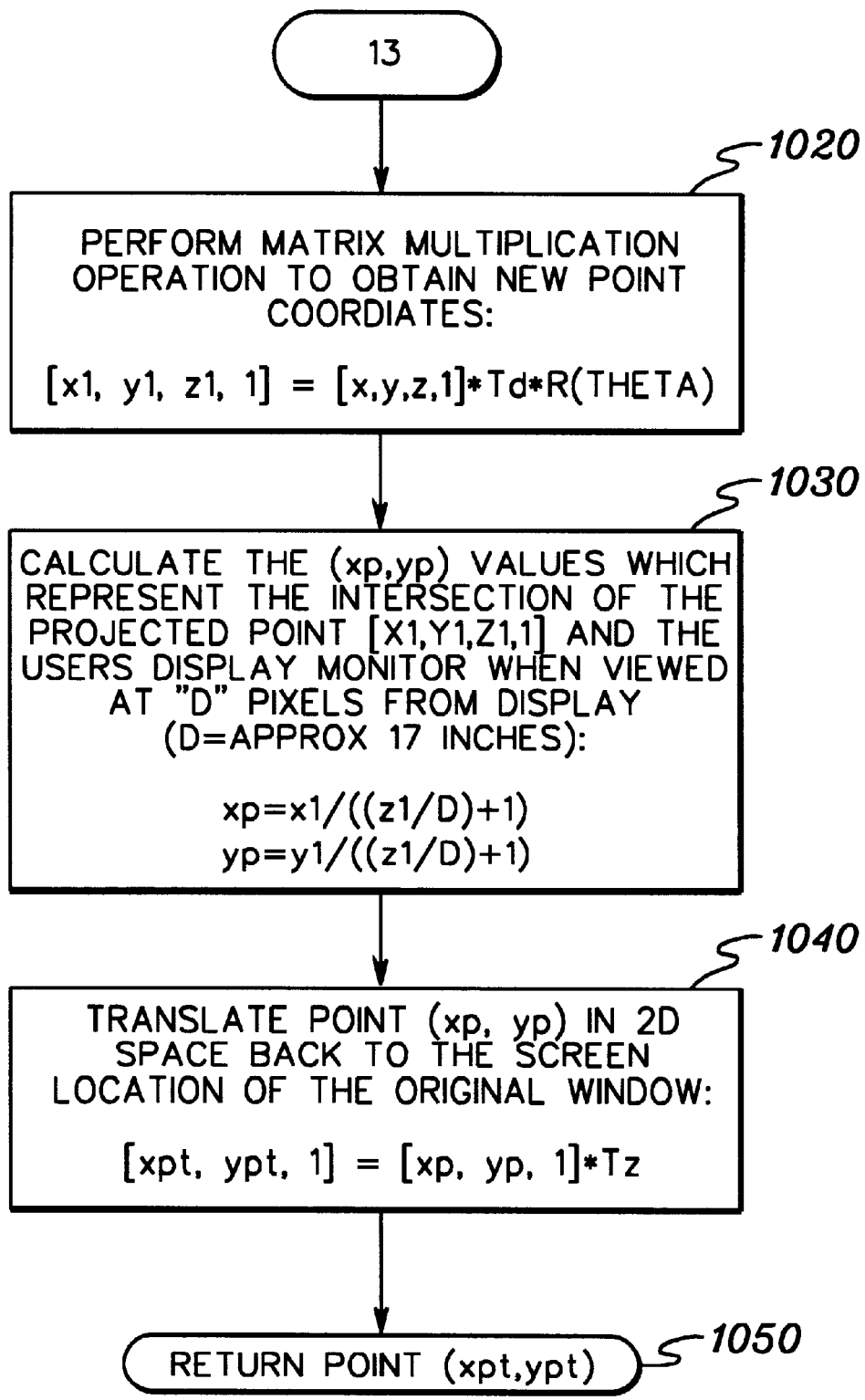

If a bottom hinge swing is to be calculated 980, the routine of FIGS. 13a & 13b is implemented. This process is generally analogous to the routine described above and depicted in FIGS. 12a & 12b. In the processing of FIGS. 13a & 13b, the 2D translation of axis matrix Tz is set to the center of the bottom frame edge of the window frame 990 (with matrix Tz depicted to the right of instruction 990). Next, the 3D translation of the axis matrix Td is set to the inverse of the center of the bottom edge of the window frame 1000, (with the mathematical matrix Td shown to the right of instruction 1000). Next, the matrix Rx(t) is set to right-hand rotation about the x axis of the window frame 1010 (matrix Rx(t) being shown to the right of instruction 1010).

A matrix multiplication operation is then performed to obtain the new point coordinates [x1, y1, z1, 1] 1020. The values (xp, yp) are calculated as representative of the intersection of the projected point [x1, y1, z1, 1] and the user's display monitor when viewed at "D" pixels from the display screen 1030. The point (xp, yp) is translated in 2D space back to the screen location of the original window defining point [xpt, ypt, 1] 1040. This translated point (xpt, ypt) is then returned 1050.

Figure 14B:
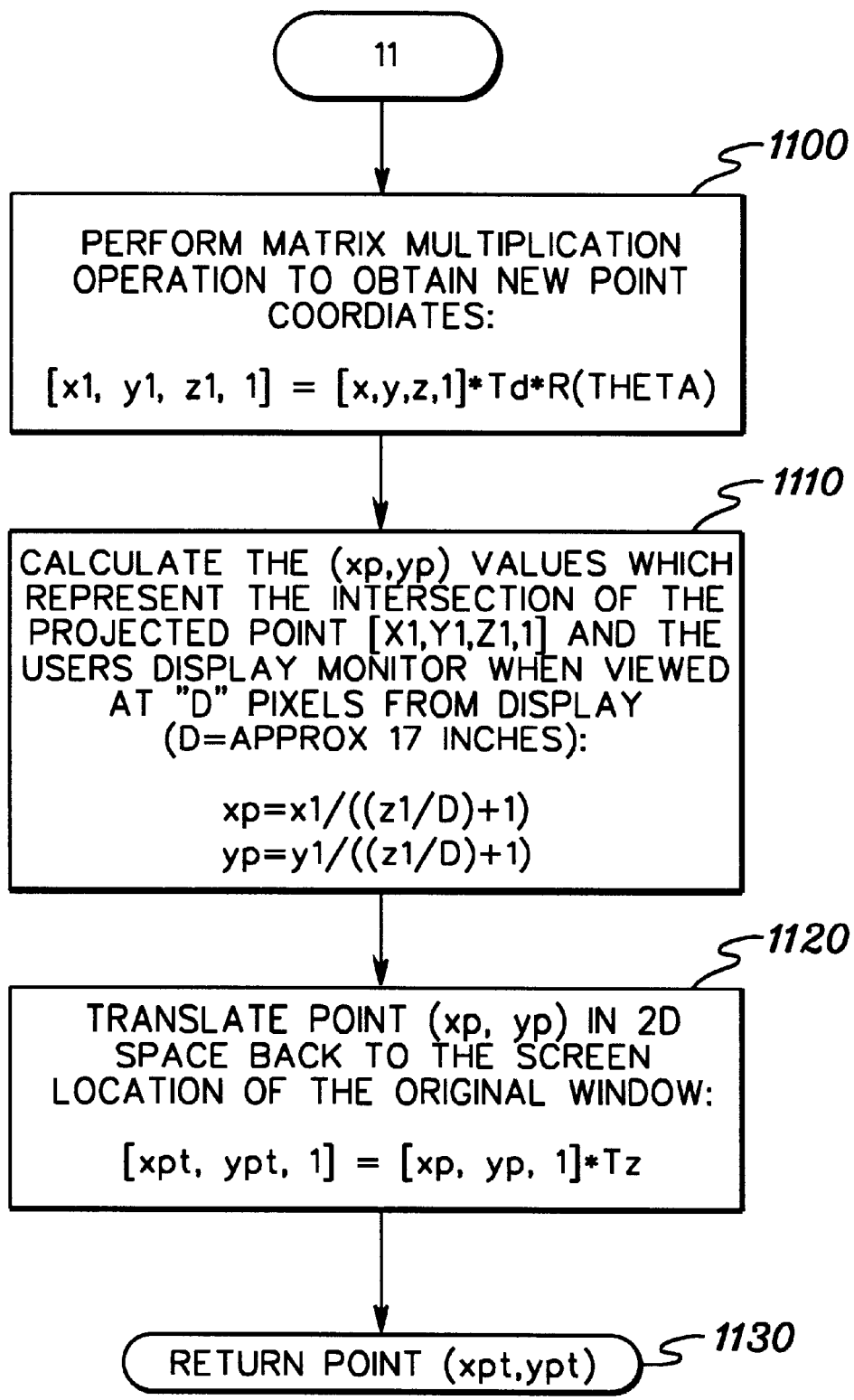

FIGS. 14a & 14b depict a routine for right hinge swing of a 2D window into a 3D display 1060. The processing is again similar to that described above. First, a 2D translation of the axis matrix Tz is set to the center of the right frame edge of the window 1070 (with mathematical matrix Tz shown to the right of instruction 1070). Next, the 3D translation of axis matrix Td is set to the inverse of the center right frame edge of the window 1080 (wherein matrix Td is shown to the right of instruction of 1080). Next, the matrix Ry(t) is set to right-hand rotation about the y axis 1090 (with the mathematical matrix Ry(t) shown to the right).

A matrix multiplication operation is then performed to obtain new point coordinates [x1, y1, z1, 1] 1100. The values xp, yp are then calculated as representing the intersection of the projected point (x1, y1, z1, 1) and the user's display monitor when viewed at "D" PIXELS from the display 1110. The point xp, yp is next translated in 2D space back to the screen location of the original window 1020, producing points xpt, ypt which are returned 1130.

Figure 15A:
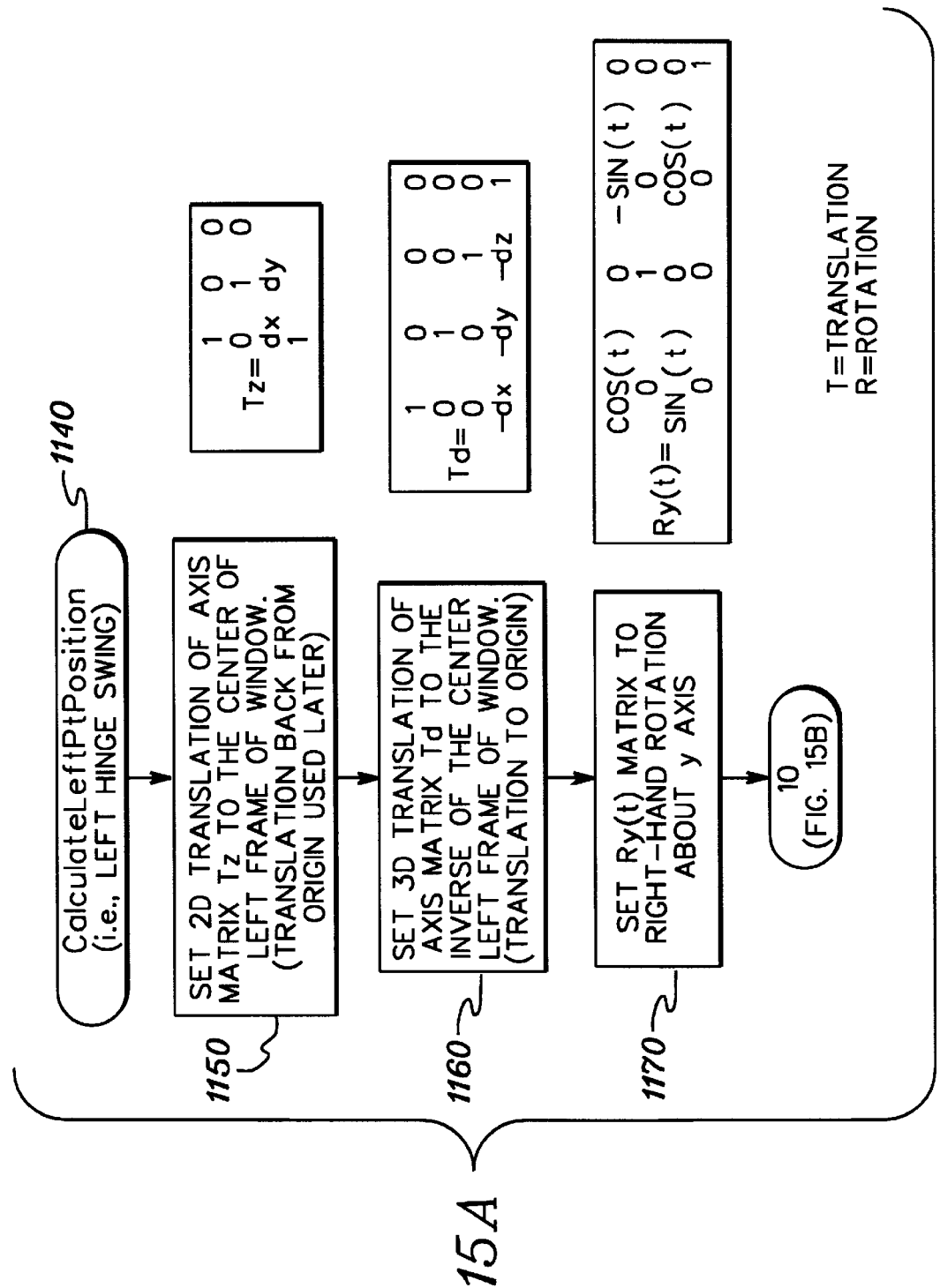
FIGS. 15a & 15b illustrate one embodiment of the flow control, mathematic matrices, and mathematical operations used to display a point from a two-dimensional window frame on to the user's display screen as a three-dimensional swung point when the swing hinge is on the left edge of the window.
Figure 15B:
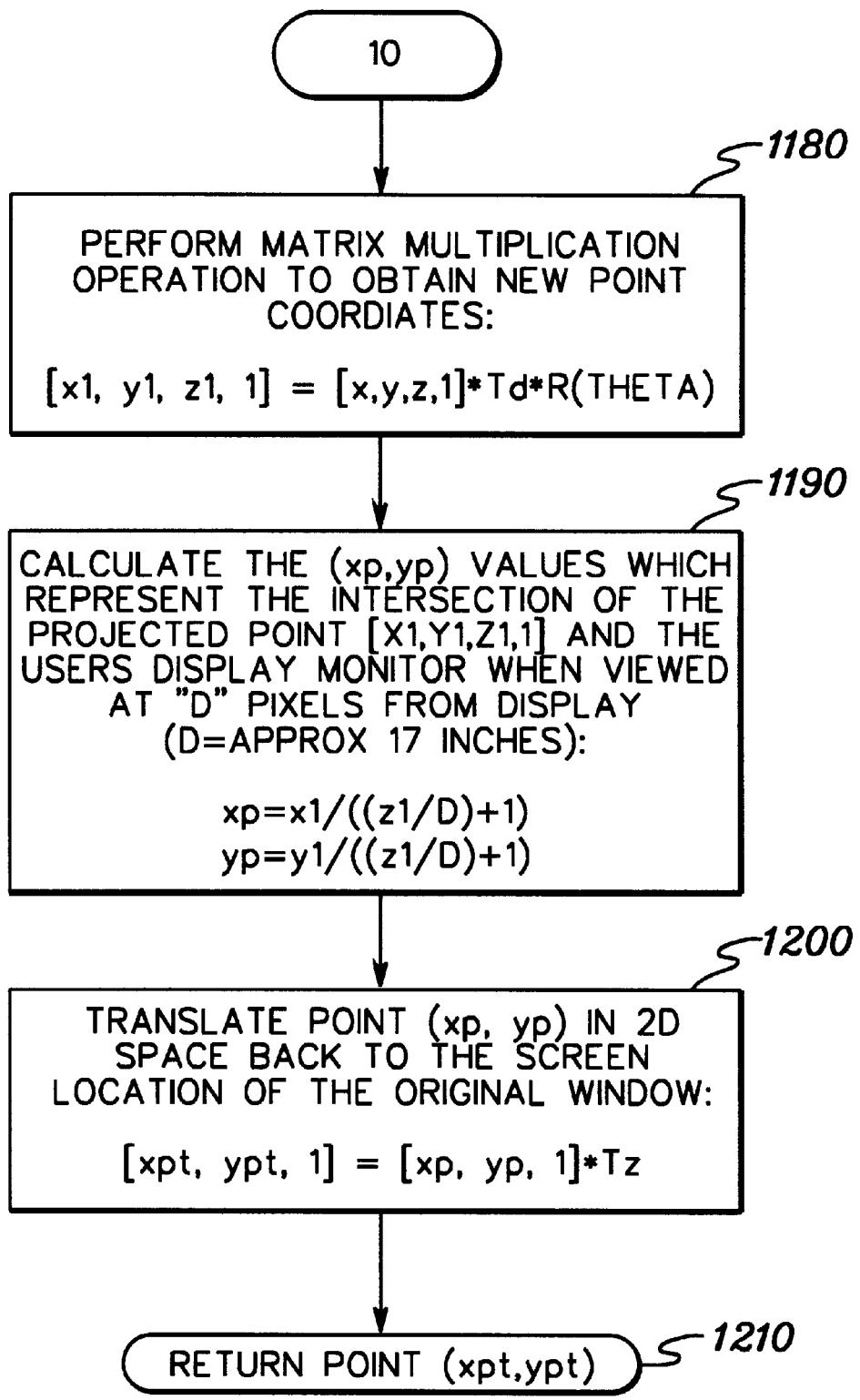

FIGS. 15a & 15b depict a routine for converting a point from a 2D window into a 3D representation where there is a left hinge swing of the 2D window 1140. Processing begins with setting a 2D translation of the axis matrix Tz to the center of the left frame edge of the window 1150 (with the mathematical matrix shown to the right of instruction 1150). A 3D translation of the axis matrix Td is set to the inverse of the center left frame edge of the window 1160 (with the mathematical matrix shown to the right of instruction 1160). Next, matrix Ry(t) is set to a right-hand rotation about the y axis 1170 (with-matrix Ry(t) shown to the right of instruction 1170).

A mathematical multiplication operation is performed to obtain new point coordinates [x1, y1, z1, 1] 1180. The values xp, yp are calculated as representing the intersection of the projected point [x1, y1, z1, 1] and the user's display monitor when viewed at "D" pixels from the display screen 1190. The point xp, yp is next translated in 2D space back to the screen location of the original window 1200 and the resulting point (xpt, ypt) is returned 1210.

Those skilled in the art will note from the above-description that the present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

Further, although applicants' method of managing and displaying a 3D window has been principally described above using software, it is clear that hardware acceleration, such as a video accelerator adaptor, could implement the methods described herein, e.g., in a hardware co-processor residing on the video accelerator card itself. Other means of hardware acceleration similar to a video co-processor could be implemented by those skilled in the art and such implementations are applicable to this application.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for displaying a window in a two-dimensional display screen, said method comprising:

providing at least one two-dimensional window for display in said two-dimensional display screen, each two-dimensional window of said at least one two-dimensional window comprising a plurality of selectable frame edges;

responsive to user input, displaying said at least one two-dimensional window in three dimensions within said two-dimensional display screen;

wherein said user input comprises allowing a user to interactively designate said at least one two-dimensional window for display in said three dimensions within said two-dimensional display screen;

wherein said allowing comprises generating a pointing indicator on said display screen superimposed over a currently visible two-dimensional window, said pointing indicator coupled to a pointing device for moving said pointing indicator in response to manipulation by said user, and changing said currently visible two-dimensional window to display as a three-dimensional window in response to said user manipulation of said pointing indicator; and wherein said changing said currently visible two-dimensional window to display as a three-dimensional window comprises swinging said two-dimensional window to said three-dimensional window display in response to user selection of one frame edge of said plurality of selectable frame edges of said two-dimensional window with said pointing indicator.

2. The method of claim 1, wherein said swinging said two-dimensional window to said three-dimensional window display occurs responsive to user selection of any frame edge of said two-dimensional window with said pointing indicator.

3. The method of claim 1, wherein said at least one two-dimensional window comprises multiple two-dimensional windows and wherein said allowing comprises allowing said user to interactively designate at least some windows of said multiple two-dimensional windows for display in three dimensions so that said multiple two-dimensional windows can be simultaneously displayed within said two-dimensional display screen without overlapping.

4. The method of claim 1, further comprising implementing said method within a window manager of a computer system comprising said two-dimensional display screen, wherein implementing of said method within said window manager of said computer system is transparent to an application process running on said computer system.

5. The method of claim 1, wherein said displaying comprises for each window of said at least one two-dimensional window, rotating said window about a frame edge of said window to convert said window from two dimensions to said three dimensions.

6. The method of claim 1, further comprising allowing a user to interactively control said rotating of said window about said frame edge of said window and thereby determine an angle of rotation of said two-dimensional window to said three dimensions.

7. A method for displaying a window in a two-dimensional display screen, said method comprising:
providing at least one two-dimensional window for display in said two-dimensional display screen;
responsive to user input, displaying said at least one two-dimensional window in three dimensions within said two-dimensional display screen;
wherein said user input comprises allowing a user to interactively designate said at least one two-dimensional window for display in said three dimensions within said two-dimensional display screen;
wherein said allowing comprises generating a pointing indicator on said display screen superimposed over a currently visible two-dimensional window, said pointing indicator coupled to a pointing device for moving said pointing indicator in response to manipulation by said user, and changing said currently visible two-dimensional window to display as a three-dimensional window in response to said user manipulation of said pointing indicator;
wherein said changing said currently visible two-dimensional window to display as a three-dimensional window comprises swinging said two-dimensional window to said three-dimensional window display in response to user selection of one frame edge of said two-dimensional window with said pointing indicator; and
wherein said swinging comprises swinging said two-dimensional window to said three-dimensional window display using a swing angle determined by a magnitude of the user's manipulation of said pointing device.

8. The method of claim 7, wherein said swing angle is adjustable within a defined range, and determined by the magnitude of the user's manipulation of said pointing device.

9. The method of claim 8, wherein said pointing device comprises a mouse and said user selection of one frame edge of said two-dimensional window comprises pressing a third mouse button of said mouse with said pointing indicator pointing to said one frame edge of said two-dimensional window.

10. The method of claim 7, wherein said swinging comprises swinging said two-dimensional window to display as a three-dimensional window by pivoting said two-dimensional window on an edge frame opposite to said one edge frame selected by said user using said pointing indicator.

11. The method of claim 7, wherein said pointing indicator is a cursor, said pointing device is a mouse, and said swing angle of said two-dimensional window to said three-dimensional window display is related to the magnitude of the user's dragging of said mouse after selection of said one edge frame of said two-dimensional window.

12. A method for displaying a window in a two-dimensional display screen, said method comprising:
providing at least one two-dimensional window for display in said two-dimensional display screen;
responsive to user input, displaying said at least one two-dimensional window in three dimensions within said two-dimensional display screen;
further comprising allowing a user to interactively designate said at least one two-dimensional window for display in said three dimensions within said two-dimensional display screen; and
wherein said allowing comprises determining a rotation point about which to rotate said at least one two-dimensional window to three-dimensional display, and translating said rotation point to a center of said two-dimensional display screen prior to rotation of said two-dimensional window to said three-dimensional display, thereafter performing said rotating of said two-dimensional window to said three-dimensional display and translating said three-dimensional display back to an original location of said two-dimensional window within said two-dimensional display screen.

13. A method for displaying a window in a two-dimensional display screen, said method comprising:
providing at least one two-dimensional window for display in said two-dimensional display screen;
responsive to user input, displaying said at least one two-dimensional window in three dimensions within said two-dimensional display screen; and
wherein each window of said at least one two-dimensional window comprises a plurality of points, and wherein for each window said displaying comprises translating each two-dimensional point of said window to an origin based on its proximity to a center of a window frame edge used as an axis of rotation of said window to said three dimensions; rotating the translated point about one of the x axis or y axis into z-space of said two-dimensional display screen using a rotation angle θ; obtaining a perspective view of the rotated window point based on a predefined user distance from the two-dimensional display screen, said perspective view lying on a z axis extending from a center of the display screen; and for each point of the window, translating the perspective point back to where the two-dimensional point had originally been located on the display screen.

14. The method of claim 1, wherein said at least one two-dimensional window comprises a rectangular window having a right edge, left edge, top edge and bottom edge, and wherein said displaying comprises rotating said window about one of said right edge, left edge, top edge or bottom edge as designated by a user.

15. A computer display system comprising:
a two-dimensional display screen for displaying one or more windows;
a window manager overseeing display of said one or more windows within said two-dimensional display screen, said window manager being programmed to display at least one two-dimensional window in three dimensions within said two-dimensional display screen responsive to user input, each two-dimensional window of said at least one two-dimensional window comprising a plurality of selectable frame edges;

wherein said window manager is programmed to allow a user to interactively designate said at least one two-dimensional window for display in said three dimensions within said two-dimensional display screen;

wherein said window manager is programmed to generate a pointing indicator on said display screen superimposed over a currently visible two-dimensional window, said pointing indicator coupled to a pointing device for moving said pointing indicator in response to manipulation by said user, and being programmed to change said currently visible two-dimensional window to display as a three-dimensional window in response to said user manipulation of said pointing indicator; and wherein said window manager is programmed to change said currently visible two-dimensional window to display as a three-dimensional window by swinging said two-dimensional window to depiction in three dimensions in response to user selection of one frame edge of said plurality of selectable frame edges of said two-dimensional window with said pointing indicator.

16. The computer display system of claim 15, wherein said swinging said two-dimensional window to depiction in three dimensions is responsive to user selection of any frame edge of said two-dimensional window with said pointing indicator.

17. The computer display system of claim 15, wherein said at least one two-dimensional window comprises multiple two-dimensional windows and wherein said window manager is programmed to allow said user to interactively designate at least some windows of said multiple two-dimensional windows for display in three dimensions so that said multiple two-dimensional windows can be simultaneously displayed within said two-dimensional display screen without overlapping.

18. The computer display system of claim 15, wherein said window manager is programmed to implement said displaying of said at least one two-dimensional window in three dimensions transparent to an application process of said computer display system.

19. The computer display system of claim 15, wherein said window manager is programmed to rotate each window of said at least one two-dimensional window about a frame edge of said window to convert said window from two dimensions to said three dimensions.

20. A computer display system comprising:

a two-dimensional display screen for displaying one or more windows;

a window manager overseeing display of said one or more windows within said two-dimensional display screen, said window manager being programmed to display at least one two-dimensional window in three dimensions within said two-dimensional display screen responsive to user input;

wherein said window manager is programmed to allow a user to interactively designate said at least one two-dimensional window for display in said three dimensions within said two-dimensional display screen;

wherein said window manager is programmed to generate a pointing indicator on said display screen superimposed over a currently visible two-dimensional window, said pointing indicator coupled to a pointing device for moving said pointing indicator in response to manipulation by said user, and being programmed to change said currently visible two-dimensional window to display as a three-dimensional window in response to said user manipulation of said pointing indicator;

wherein said window manager is programmed to change said currently visible two-dimensional window to display as a three-dimensional window by swinging said two-dimensional window to depiction in three dimensions in response to user selection of one frame edge of said two-dimensional window with said pointing indicator; and wherein said swinging comprises swinging said two-dimensional window to said three-dimensional window display using a swing angle determined by a magnitude of the user's manipulation of said pointing device.

21. The computer display system of claim 20, wherein said swing angle is adjustable within a defined range, and determined by the magnitude of the user's manipulation of said pointing device.

22. The computer display system of claim 21, wherein said pointing device comprises a mouse and said user selection of said one frame edge of said two dimensional window comprises user pressing of a third mouse button of said mouse with said pointing indicator pointing to said one frame edge of said two-dimensional window.

23. The computer display system of claim 20, wherein said window manager's swinging of said two-dimensional window comprises swinging said two-dimensional window to display as a three-dimensional window by pivoting said two-dimensional window on an edge frame opposite to said one-edge frame selected by said user using said pointing indicator.

24. The computer display system of claim 23, wherein said pointing indicator is a cursor, said pointing device is a mouse, and said swing angle of said two-dimensional window to said three-dimensional window display is related to a magnitude of the user's dragging of said mouse after selection of said one edge frame of said two-dimensional window.

25. A computer display system comprising:

a two-dimensional display screen for displaying one or more windows;

a window manager overseeing display of said one or more windows within said two-dimensional display screen, said window manager being programmed to display at least one two-dimensional window in three dimensions within said two-dimensional display screen responsive to user input;

wherein said window manager is programmed to allow a user to interactively designate said at least one two-dimensional window for display in said three dimensions within said two-dimensional display screen; and wherein said window manager is programmed to determine a rotation point about which to rotate said at least one two-dimensional window to three-dimensional display, and to translate said rotation point to a center of said two-dimensional display screen prior to rotation of said two-dimensional window to said three-dimensional display, and thereafter to perform said rotating of said two-dimensional window to said three-dimensional display and then to translate said three-dimensional display back to an original location of said two-dimensional window within said two-dimensional display screen.

26. A system for displaying a window in a two-dimensional display screen, said system comprising:

means for providing at least one two-dimensional window for display in said two-dimensional display screen, each two-dimensional window of said at least one two-dimensional window comprising a plurality of selectable frame edges;

means for allowing a user to designate said at least one two-dimensional window for display as a three-dimensional window within said two-dimensional display screen;

wherein said means for allowing comprises means for allowing said user to interactively designate said at least one two-dimensional window for display as a three-dimensional window;

wherein said means for allowing comprises means for generating a pointing indicator on said display screen superimposed over a currently visible two-dimensional window, said pointing indicator being coupled to a pointing device for moving said pointing indicator in response to manipulation by said user, and means for changing said currently visible two-dimensional window to display as a three-dimensional window in response to said user manipulation of said pointing indicator; and wherein said means for changing said currently visible two-dimensional window to display as a three-dimensional window comprises means for swinging said two-dimensional window to said three-dimensional window display in response to user selection of one frame edge of said plurality of selectable frame edges of said two-dimensional window with said pointing indicator.

27. The system of claim 26, wherein said means for swinging comprises means for swinging said two-dimensional window to said three-dimensional window display in response to user selection of any frame edge of said two-dimensional window with said pointing indicator.

28. The system of claim 26, wherein said pointing device comprises a mouse and said user selection of said one frame edge of said two-dimensional window comprises user pressing of a third mouse button of said mouse with said pointing indicator pointing to said one frame edge of said two-dimensional window.

29. The system of claim 26, wherein said at least one two-dimensional window comprises multiple two-dimensional windows and wherein said means for allowing comprises means for allowing said user to interactively designate at least some windows of said multiple two-dimensional windows for display in three dimensions so that said multiple two-dimensional windows can be simultaneously displayed within said two-dimensional display screen without overlapping.

30. The system of claim 26, wherein said means for allowing comprises means for rotating each window of said at least one two-dimensional window about a frame edge of said window upon designation by said user to convert said window from two dimensions to three dimensions within said display screen.

31. A system for displaying a window in a two-dimensional display screen, said system comprising:

means for providing at least one two-dimensional window for display in said two-dimensional display screen;

means for allowing a user to designate said at least one two-dimensional window for display as a three-dimensional window within said two-dimensional display screen;

wherein said means for allowing comprises means for allowing said user to interactively designate said at least one two-dimensional window for display as a three-dimensional window;

wherein said means for allowing comprises means for generating a pointing indicator on said display screen superimposed over a currently visible two-dimensional window, said pointing indicator being coupled to a pointing device for moving said pointing indicator in response to manipulation by said user, and means for changing said currently visible two-dimensional window to display as a three-dimensional window in response to said user manipulation of said pointing indicator;

wherein said means for changing said currently visible two-dimensional window to display as a three-dimensional window comprises means for swinging said two-dimensional window to said three-dimensional window display in response to user selection of one frame edge of said two-dimensional window with said pointing indicator; and wherein said swinging comprises swinging said two-dimensional window to said three-dimensional window display using a swing angle determined by the magnitude of the user's manipulation of said pointing device.

32. The system of claim 31, wherein the swing angle is adjustable within a defined range, and is determined by the magnitude of the user's manipulation of said pointing device.

33. The system of claim 31, wherein said means for swinging comprises means for swinging said two-dimensional window to display as a three-dimensional window by pivoting said two-dimensional window on an edge frame opposite to said one edge frame selected by said user using said pointing indicator.

34. The system of claim 33, wherein said pointing indicator is a cursor, said pointing device is a mouse, and said swing angle of said two-dimensional window to said three-dimensional window display is related to the magnitude of the user's dragging of said mouse after selection of said one edge frame of said two-dimensional window.

35. An article of manufacture comprising:

a computer program product comprising computer usable medium having computer readable program code means therein for use in displaying a window in a two-dimensional display screen, said computer readable program code means in said computer program product comprising:

computer readable program code means for causing a computer to effect providing at least one two-dimensional window for display in said two-dimensional display screen, each two-dimensional window of said at least one two-dimensional window comprising a plurality of selectable frame edges;

computer readable program code means for causing a computer to effect allowing a user to designate said at least one two-dimensional window for display as a three-dimensional window within said two-dimensional display screen;

wherein said computer readable program code means for causing a computer to effect allowing comprises computer readable program code means for causing a computer to effect generating a pointing indicator on said display screen superimposed over a currently visible two-dimensional window, said pointing indicator coupled to a pointing device for moving said pointing indicator in response to manipulation by said user, and computer readable program code means for causing a computer to effect changing said currently visible two-dimensional window to display as a three-dimensional window in response to said user manipulation of said pointing indicator; and wherein said computer readable program code means for causing a computer to effect changing comprises computer readable program code means for causing a computer to effect swinging said two-dimensional window to said three-dimensional window display in response to user selection of one frame edge of said plurality of selectable frame edges of said two-dimensional window with said pointing indicator.

36. The article of manufacture of claim 35, wherein said computer readable program code means for causing a computer to effect swinging said two-dimensional window to said three-dimensional window display is responsive to user selection of any frame edge of said two-dimensional window with said pointing indicator.

37. The article of manufacture of claim 35, wherein said pointing device comprises a mouse and said user selection of said one frame edge of said two-dimensional window comprises user pressing of a third mouse button of said mouse with said pointing indicator pointing to said one frame edge of said two-dimensional window.

38. The article of manufacture of claim 35, further comprising computer readable program code means for causing a computer to effect implementing said allowing within a window manager associated with said two-dimensional display screen, wherein said computer readable program code means for causing a computer to effect said implementing within said window manager is transparent to an application process running on a computer system associated with said two-dimensional display screen.

39. The article of manufacture of claim 35, wherein said computer readable program code means for causing a computer to effect allowing comprises computer readable program code means for causing a computer to effect rotating said window about a frame edge of said window to convert said window from two-dimensions to said three-dimensions.

40. An article of manufacture comprising:

a computer program product comprising computer usable medium having computer readable program code means therein for use in displaying a window in a two-dimensional display screen, said computer readable program code means in said computer program product comprising:

computer readable program code means for causing a computer to effect providing at least one two-dimensional window for display in said two-dimensional display screen;

computer readable program code means for causing a computer to effect allowing a user to designate said at least one two-dimensional window for display as a three-dimensional window within said two-dimensional display screen;

wherein said computer readable program code means for causing a computer to effect allowing comprises computer readable program code means for causing a computer to effect generating a pointing indicator on said display screen superimposed over a currently visible two-dimensional window, said pointing indicator coupled to a pointing device for moving said pointing indicator in response to manipulation by said user, and computer readable program code means for causing a computer to effect changing said currently visible two-dimensional window to display as a three-dimensional window in response to said user manipulation of said pointing indicator;

wherein said computer readable program code means for causing a computer to effect changing comprises computer readable program code means for causing a computer to effect swinging said two-dimensional window to said three-dimensional window display in response to user selection of one frame edge of said two-dimensional window with said pointing indicator; and wherein the swinging comprises swinging said two-dimensional window to said three-dimensional window display using a swing angle determined by a magnitude of the user's manipulation of the pointing device and wherein the swing angle is adjustable within a defined range as determined by the magnitude of the user's manipulation of the pointing device.

41. The article of manufacture of claim 40, wherein said computer readable program code means for causing a computer to effect swinging comprises computer readable program code means for causing a computer to effect swinging said two-dimensional window to display as a three-dimensional window by pivoting said two-dimensional window on an edge frame opposite to said one edge frame selected by said user using said pointing indicator.

42. The article of manufacture of claim 41, wherein said pointing indicator is a cursor, said pointing device is a mouse, and said swing angle of said two-dimensional window to said three-dimensional window display is related to a magnitude of the user's dragging of said mouse after selection of said one edge frame of said two-dimensional window.

43. A method for displaying a window in a two-dimensional display screen, said method comprising:

providing at least one two-dimensional window for display in said two-dimensional display screen;

responsive to user input, displaying said at least one two-dimensional window in three dimensions within said two-dimensional display screen;

wherein said user input comprises allowing a user to interactively designate said at least one two-dimensional window for display in said three dimensions within said two-dimensional display screen;

wherein said allowing comprises generating a pointing indicator on said display screen superimposed over a currently visible two-dimensional window, said pointing indicator coupled to a pointing device for moving said pointing indicator in response to manipulation by said user, and changing said currently visible two-dimensional window to display as a three-dimensional window in response to said user manipulation of said pointing indicator;

wherein said changing said currently visible two-dimensional window to display as a three-dimensional window comprises swinging said two-dimensional window to said three-dimensional window display in response to user selection of one frame edge of said two-dimensional window with said pointing indicator; and wherein said user selection of said one frame edge using said pointing indicator occurs independent of any control bar associated with the two-dimensional window.

* * * * *

UNITED STATES PATENT AND TRADEMARK OFFICE
CERTIFICATE OF CORRECTION

PATENT NO. : 6,822,662 B1
DATED : November 23, 2004
INVENTOR(S) : Cook et al.

It is certified that error appears in the above-identified patent and that said Letters Patent is hereby corrected as shown below:

Column 9,
Line 31, delete the word "is" in the second instance, and insert -- to --

Signed and Sealed this

Eighth Day of February, 2005

JON W. DUDAS
*Director of the United States Patent and Trademark Office*